(12) United States Patent
Nagayama et al.

(10) Patent No.: US 10,920,623 B2
(45) Date of Patent: Feb. 16, 2021

(54) PLANT CONTROL APPARATUS, PLANT CONTROL METHOD AND POWER PLANT

(71) Applicants: KABUSHIKI KAISHA TOSHIBA, Minato-ku (JP); TOSHIBA ENERGY SYSTEMS & SOLUTIONS CORPORATION, Kawasaki (JP)

(72) Inventors: Kanako Nagayama, Yokohama (JP); Masayuki Tobo, Kawasaki (JP); Yuta Iwata, Yokohama (JP); Shoji Kaneko, Yokohama (JP); Takahiro Mori, Yokohama (JP)

(73) Assignees: KABUSHIKI KAISHA TOSHIBA, Minato-ku (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 16/394,027

(22) Filed: Apr. 25, 2019

(65) Prior Publication Data

US 2020/0040770 A1    Feb. 6, 2020

(30) Foreign Application Priority Data

Aug. 1, 2018  (JP) .............................. JP2018-145385

(51) Int. Cl.
*F01K 23/10* (2006.01)
*F01K 7/16* (2006.01)
(Continued)

(52) U.S. Cl.
CPC ............ *F01K 23/101* (2013.01); *F01D 19/00* (2013.01); *F01D 19/02* (2013.01); *F01D 21/00* (2013.01);
(Continued)

(58) Field of Classification Search
CPC ........ F01K 23/101; F01K 7/165; F01K 23/16; F01K 13/02; F01K 11/02; F01D 19/00; F01D 19/02; F01D 21/00
(Continued)

(56) References Cited

U.S. PATENT DOCUMENTS 2,911,789 A * 11/1959 Baker ..................... F01K 13/02
                                                       60/39.182
5,203,160 A    4/1993 Ozono
(Continued)

FOREIGN PATENT DOCUMENTS

JP        02-308903        12/1990
JP        04-148002         5/1992
(Continued)

*Primary Examiner* — Hoang M Nguyen
(74) *Attorney, Agent, or Firm* — Oblon, McClelland, Maier & Neustadt, L.L.P.

(57) ABSTRACT

In one embodiment, a plant control apparatus controls a power plant, which includes a gas turbine, a generator driven by the gas turbine, an exhaust heat recovering boiler to generate first steam using heat of exhaust gas from the gas turbine, a steam turbine driven by the first steam, and a clutch to connect a first shaft connected to the gas turbine and generator with a second shaft connected to the steam turbine. The apparatus includes a starting module to start the gas turbine and generator while holding the steam turbine in a stop state, when the clutch is in a released state. The apparatus further includes a warming module to warm the steam turbine by supplying second steam from equipment different from the boiler to the steam turbine in parallel with the starting of the gas turbine and generator, when the clutch is in a released state.

14 Claims, 12 Drawing Sheets

(51) Int. Cl.
*F01K 23/16* (2006.01)
*F01K 13/02* (2006.01)
*F01K 11/02* (2006.01)
*F01D 19/00* (2006.01)
*F01D 19/02* (2006.01)
*F01D 21/00* (2006.01)

(52) U.S. Cl.
CPC .............. *F01K 7/165* (2013.01); *F01K 11/02* (2013.01); *F01K 13/02* (2013.01); *F01K 23/16* (2013.01)

(58) Field of Classification Search
USPC ...................................... 60/39.182, 646, 657
See application file for complete search history.

(56) References Cited

U.S. PATENT DOCUMENTS

| | | | | |
|---|---|---|---|---|
| 2004/0045299 A1* | 3/2004 | Blatter | ................... | F01D 19/00 60/772 |
| 2004/0065089 A1* | 4/2004 | Liebig | ................... | F01K 23/103 60/772 |
| 2009/0325765 A1* | 12/2009 | Humer | ................... | F01K 23/16 477/180 |
| 2010/0005775 A1* | 1/2010 | Kipping | ................... | F01K 15/02 60/39.182 |
| 2014/0331686 A1* | 11/2014 | Gulen | ................... | F01K 23/10 60/783 |
| 2015/0184552 A1 | 7/2015 | Tobo et al. | | |
| 2017/0101901 A1 | 4/2017 | Greis et al. | | |
| 2019/0024529 A1 | 1/2019 | Kajihara et al. | | |
| 2019/0284963 A1 | 9/2019 | Ngo et al. | | |

FOREIGN PATENT DOCUMENTS

| | | |
|---|---|---|
| JP | 4-159402 A | 6/1992 |
| JP | 07-072491 | 8/1995 |
| JP | 2002-70506 A | 3/2002 |
| JP | 2019-23463 A | 2/2019 |
| JP | 2019-157848 A | 9/2019 |
| KR | 10-2015-0076112 A | 7/2015 |
| KR | 10-2016-0140906 A | 12/2016 |

* cited by examiner

PLANT CONTROL APPARATUS, PLANT CONTROL METHOD AND POWER PLANT

CROSS REFERENCE TO RELATED APPLICATION

This application is based upon and claims the benefit of priority from the prior Japanese Patent Application No. 2018-145385, filed on Aug. 1, 2018, the entire contents of which are incorporated herein by reference.

FIELD

Embodiments described herein relate to a plant control apparatus, a plant control method and a power plant.

BACKGROUND

There is known a combined cycle power plant configured by a combination of a gas turbine, an exhaust heat recovering boiler and a steam turbine. The exhaust heat recovering boiler recovers heat from exhaust gas of the gas turbine to generate steam. The steam turbine is driven by the steam generated by the exhaust heat recovering boiler.

DETAILED DESCRIPTION

Figure 1:
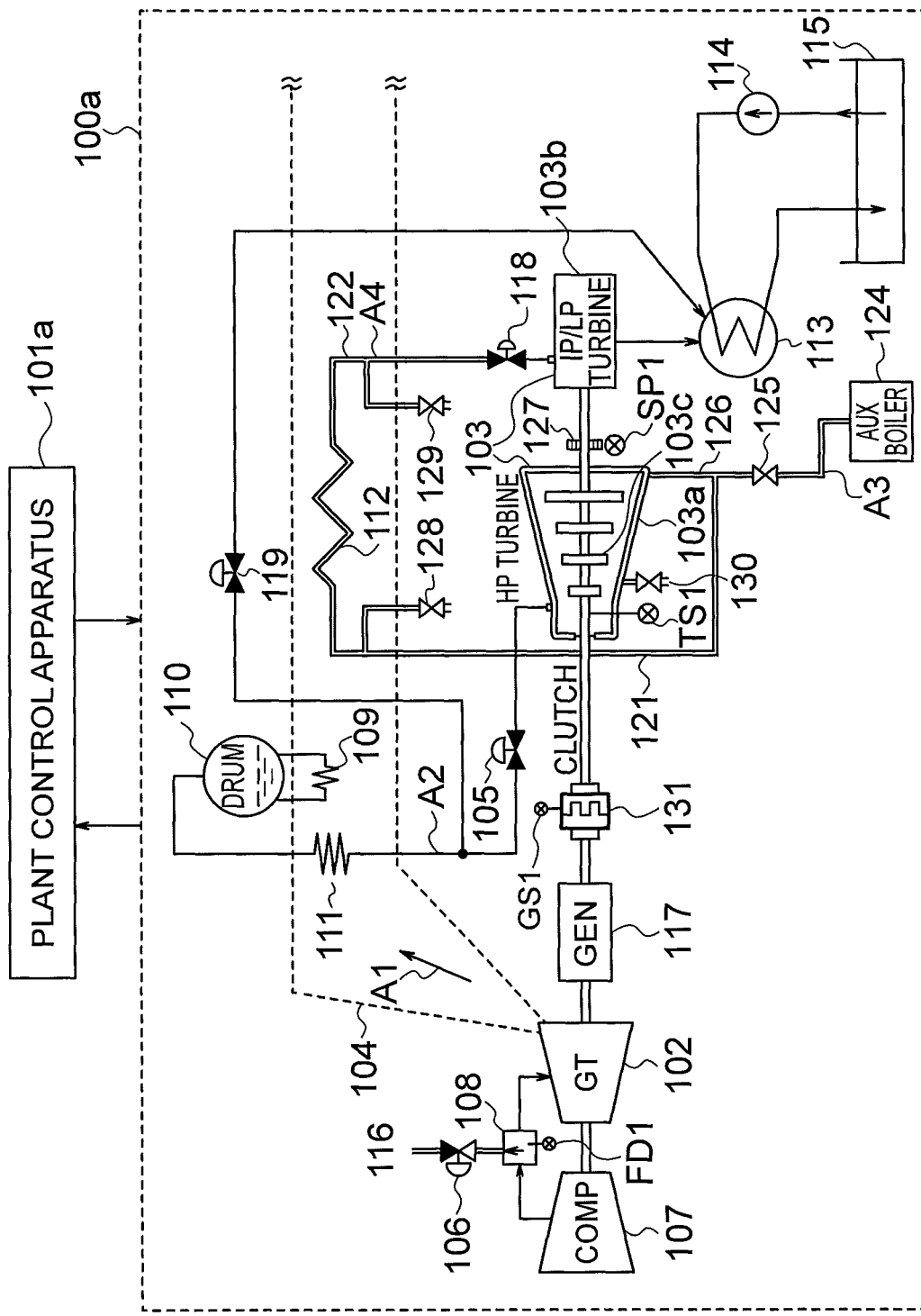
FIG. 1 is a schematic diagram illustrating a configuration of a power plant of a first embodiment.

Embodiments will now be explained with reference to the accompanying drawings. In FIGS. 1 to 9B, the same or similar components are denoted by the same reference numerals, and redundant description thereof will be omitted.

Generally, when cold starting of a steam turbine is performed, while a rotor of the steam turbine is cryogenic, steam that drives this has a high temperature, and therefore a large temperature difference is generated, and large thermal stress is generated during starting due to this. As a method for reducing this thermal stress, prewarming is known. A traditional prewarming is to perform warming of a high-pressure rotor by sending auxiliary steam from a high-pressure turbine exhaust portion during turning operation before starting of the steam turbine. Thermal stress at the time of starting is more severe to a large steam turbine that has large capacity and has a thick constituent member, and therefore prewarming is applied to a large-capacity steam turbine mainly used in a steam power plant, a multi-axial combined power plant, or the like. However, with recent size increase and high performance of the gas turbine, the capacity of a steam turbine of a single shaft combined power plant becomes large, and prewarming is applied.

Originally, prewarming requires a long time of 3 hours to 5 hours. Prewarming that requires a long time is a problem from the viewpoint of starting a plant earlier. Steam power plants are relatively tolerant to late starting. On the other hand, combined cycle power plants have merits in high efficiency and early starting time and hence, late starting time caused by performing prewarming is not desirable. Various attempts to shorten a prewarming time have been carried out. However, there is a limitation on shortening the prewarming time.

On the other hand, clutch connecting-type single shaft combined power plants are recently introduced. In the clutch connecting-type plant, when a gas turbine and a steam turbine are driven, a clutch mitigates thrust force (force that axially acts) which one of the turbines receives from the other turbine, and therefore various merits such as reduction of a burden in designing are pointed out. Therefore, the clutch connecting-type plant is regarded as the mainstream of a future single shaft combined power plant, and it is considered that a need for prewarming suitably applicable to a clutch connecting-type plant grows.

In one embodiment, a plant control apparatus is configured to control a power plant. The plant includes a gas turbine, a generator configured to be driven by the gas turbine, an exhaust heat recovering boiler configured to generate first steam by using heat of exhaust gas from the gas turbine, a steam turbine configured to be driven by the first steam, and a clutch configured to connect a first shaft that is connected to the gas turbine and to the generator with a second shaft that is connected to the steam turbine. The apparatus includes a starting module configured to start the gas turbine and the generator while holding the steam turbine in a stop state, when the clutch is in a released state. The apparatus further includes a warming module configured to warm the steam turbine by supplying second steam from equipment that is different from the exhaust heat recovering boiler to the steam turbine in parallel with starting of the gas turbine and the generator, when the clutch is in a released state.

First Embodiment

Hereinafter, a first embodiment is described. First to third comparative examples are also described in the description of this embodiment.

(1) Configuration of Plant of First Comparative Example

Figure 8:
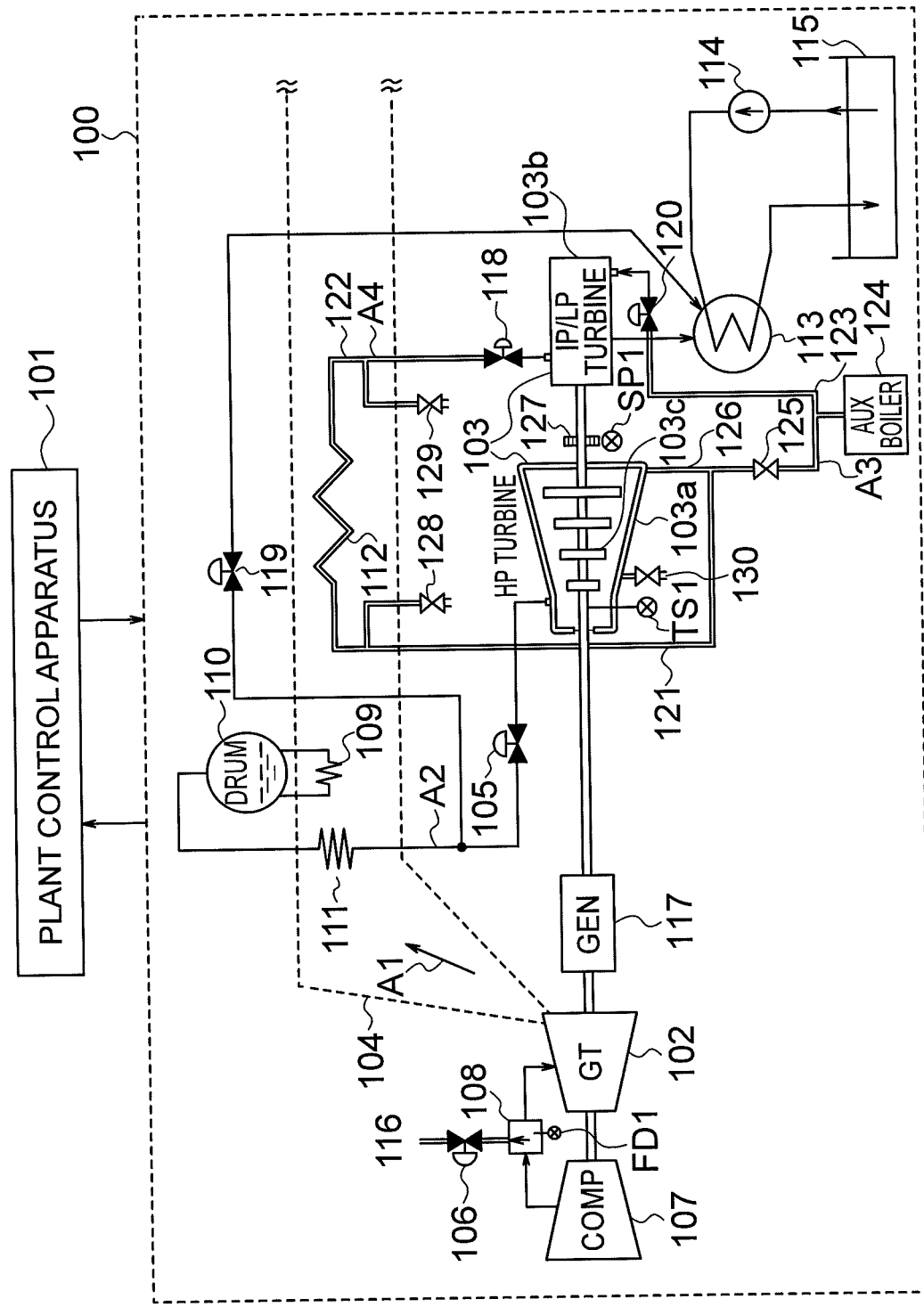
FIG. 8 is a schematic diagram illustrating a configuration of a power plant of the first comparative example.

FIG. 8 is a schematic diagram illustrating a configuration of a power plant 100 of a first comparative example. The power plant 100 illustrated in FIG. 8 is a single shaft combined cycle (C/C) power plant.

The power plant 100 illustrated in FIG. 8 includes a plant control apparatus 101 that controls operation of the power plant 100, and further includes a gas turbine (GT) 102, a steam turbine (ST) 103, an exhaust heat recovering boiler 104, an MCV valve (high-pressure regulator valve) 105, a fuel control valve 106, a compressor 107, a combustor 108, an evaporator 109, a drum 110, a superheater 111, a reheater 112, a condenser 113, a circulating water pump 114, an intake portion and a discharge portion for seawater 115, a supply portion for fuel 116, a generator 117, an ICV valve (intercept valve) 118, a high-pressure turbine bypass control valve 119, an LPCV valve (low-pressure regulator valve) 120, a low-temperature reheating pipe 121, a high-temperature reheating pipe 122, a gas feed pipe 123, an auxiliary boiler 124, a warming valve 125, a high-pressure turbine exhaust pipe 126, a gear wheel 127 for detection, reheating drain valves 128 and 129, and a casing drain valve 130.

The steam turbine 103 includes a high-pressure turbine 103a, an intermediate/low-pressure turbine 103b, and a high-pressure rotor 103c. The power plant 100 further includes a first stage inner surface metal temperature sensor TS1, an ST rotation number detector SP1, and a flame detector FD1.

The fuel control valve 106 is provided in a fuel pipe. When the fuel control valve 106 is opened, the fuel 116 is supplied from the fuel pipe to the combustor 108. The compressor 107 introduces air from an inlet thereof, and supplies compressed air to the combustor 108. The combustor 108 burns the fuel 116 together with oxygen in the compressed air, and generates high-temperature and high-pressure combustion gas. The flame detector FD1 detects flame in the combustor 108, and outputs a detection result of the flame to the plant control apparatus 101.

In this comparative example, the gas turbine 102, the steam turbine 103, and the generator 117 are fixed to the same rotating shaft (rotor). The gas turbine 102 is rotationally driven by the combustion gas to rotate the rotating shaft. The generator 117 is connected to the rotating shaft, and generates power by using the rotation of the rotating shaft. Thus, the generator 117 is driven by the gas turbine 102. Gas turbine exhaust gas A1 discharged from the gas turbine 102 is sent to the exhaust heat recovering boiler 104. The exhaust heat recovering boiler 104 generates main steam A2 by using heat of the gas turbine exhaust gas A1, as described below.

The evaporator 109, the drum 110, the superheater 111, and the reheater 112 are provided in the exhaust heat recovering boiler 104, and configure a part of the exhaust heat recovering boiler 104. Water in the drum 110 is sent to the evaporator 109, and heated by the gas turbine exhaust gas A1 in the evaporator 109 to become saturated steam. The saturated steam is sent to the superheater 111, and superheated in the superheater 111 by the gas turbine exhaust gas A1 to become superheated steam. The superheated steam generated by the exhaust heat recovering boiler 104 is discharged to a steam pipe, as the main steam A2.

The steam pipe is branched into a main pipe and a bypass pipe. The main pipe is connected to the high-pressure turbine 103a, and the bypass pipe is connected to the condenser 113. The MCV valve 105 is provided in the main pipe. The high-pressure turbine bypass control valve 119 is provided in the bypass pipe.

When the MCV valve 105 is opened, the main steam A2 from the main pipe is supplied to the high-pressure turbine 103a. The high-pressure turbine 103a is rotationally driven by the main steam A2 to rotate the rotating shaft together with the gas turbine 102. As a result, the generator 117 is driven by the gas turbine 102 and the high-pressure turbine 103a. The high-pressure rotor 103c is a portion of the rotating shaft in the high-pressure turbine 103a. The main steam A2 (exhaust steam) discharged from an exhaust port (high-pressure exhaust portion) of the high-pressure turbine 103a is supplied to the reheater 112 through the high-pressure turbine exhaust pipe 126 and the low-temperature reheating pipe 121. The first stage inner surface metal temperature sensor TS1 detects the metal temperature of a first stage inner surface of the high-pressure turbine 103a, and outputs a detection result of the metal temperature to the plant control apparatus 101. The casing drain valve 130 is provided in a pipe connected to the high-pressure turbine 103a, and is used to discharge drain water generated in the high-pressure turbine 103a.

On the other hand, when the high-pressure turbine bypass control valve 119 is opened, the main steam A2 from the bypass pipe bypasses the high-pressure turbine 103a and the intermediate/low-pressure turbine 103b, and is sent to the condenser 113.

One end (hereinafter referred to as a "first end") of the reheater 112 is connected to the low-temperature reheating pipe 121, and the other end (hereinafter referred to as a "second end") of the reheater 112 is connected to the high-temperature reheating pipe 122. The reheater 112 in this comparative example takes the main steam A2 (exhaust steam) from the high-pressure turbine 103a from the first end, and discharges this main steam A2 from the second end.

For example, the reheater 112 takes the main steam A2 from the high-pressure turbine 103a from the first end, and heats the main steam A2 by the gas turbine exhaust gas A1 to generate reheat steam A4. That is, the main steam A2 is heated to become the reheat steam A4. The reheater 112 discharges this reheat steam A4 from the second end to the high-temperature reheating pipe 122. The reheating drain valve 128 is provided in a pipe branched from the low-temperature reheating pipe 121 near the first end, and is used in order to discharge drain water generated in the reheater 112. On the other hand, the reheating drain valve 129 is provided in a pipe branched from the high-temperature reheating pipe 122 near the second end, and is used in order to discharge the drain water generated in the reheater 112.

The high-temperature reheating pipe 122 is connected to the ICV valve 118. When the ICV valve 118 is opened, the reheat steam A4 from the high-temperature reheating pipe 122 is supplied to the intermediate/low-pressure turbine 103b. The intermediate/low-pressure turbine 103b includes an intermediate-pressure turbine and a low-pressure turbine, and is rotationally driven by the reheat steam A4 to rotate the rotating shaft together with the gas turbine 102 and the high-pressure turbine 103a. As a result, the generator 117 is driven by the gas turbine 102, the high-pressure turbine 103a, and the intermediate/low-pressure turbine 103b. The reheat steam A4 (exhaust steam) discharged from the intermediate/low-pressure turbine 103b is sent to the condenser 113.

The condenser 113 cools the reheat steam A4 by the seawater 115, and returns the reheat steam A4 to the seawater 115. The circulating water pump 114 takes the seawater 115 from the sea, and supplies the seawater to the condenser 113.

The gear wheel 127 for detection is provided on the rotating shaft between the high-pressure turbine 103a and the intermediate/low-pressure turbine 103b. The ST rotation number detector SP1 detects the rotation number (rotating speed) of the rotating shaft by using the gear wheel 127 for detection, and outputs a detection result of the rotation number to the plant control apparatus 101.

The auxiliary boiler 124 is installed in the power plant 100 in order to generate steam (auxiliary steam A3) without using the exhaust heat recovering boiler 104. The auxiliary steam A3 generated by the auxiliary boiler 124 can be supplied to the high-pressure turbine 103a through the high-pressure turbine exhaust pipe 126 by opening the warming valve 125. Consequently, the high-pressure turbine 103a can be warmed by the auxiliary steam A3. This warming is performed as prewarming of the high-pressure turbine 103a.

The gas feed pipe 123 is provided between the intermediate/low-pressure turbine 103b and the auxiliary boiler 124. The LPCV valve 120 is provided in the gas feed pipe 123. The auxiliary steam A3 in this comparative example can be supplied to the intermediate/low-pressure turbine 103b by opening the LPCV valve 120.

The plant control apparatus 101 controls various operation of the power plant 100. For example, the plant control apparatus 101 controls opening/closing of the MCV valve 105, the fuel control valve 106, the ICV valve 118, the high-pressure turbine bypass control valve 119, the LPCV valve 120, the warming valve 125, the reheating drain valves 128 and 129, and the casing drain valve 130, operation of the exhaust heat recovering boiler 104, the compressor 107, the combustor 108, the condenser 113, the circulating water pump 114, and the auxiliary boiler 124, and the like.

In the power plant 100 of this comparative example, the gas turbine 102 and the steam turbine 103 are fixed to the same shaft. This type of power plant is referred to as a "single shaft combined cycle power plant with rigid connection" or simply referred to as "rigid connection C/C". Hereinafter, the plant starting of the power plant 100 (rigid connection C/C) of this comparative example will be described.

(2) Prewarming in First Comparative Example

FIG. 8 illustrates a state in which prewarming of the power plant 100 with the rigid connection C/C is performed. In the opening/closing state of each valve illustrated in FIG. 8, a fully blackened valve is "fully closed", a fully whitened valve is "fully opened", and a half blackened and half whitened valve is at an "intermediate opening degree".

Prewarming of the power plant 100 with the rigid connection C/C is operation to warm the high-pressure rotor 103c to a predetermined temperature by feeding the auxiliary steam A3 to the high-pressure turbine 103a when both the gas turbine 102 and the steam turbine 103 are in a stop state. At this time, the auxiliary steam A3 is also fed to the reheater 112 in addition to the high-pressure turbine 103a so that warming of the reheater 112 is also performed. In other words, prewarming of the high-pressure turbine 103a and prewarming of the reheater 112 progress simultaneously. Hereinafter, such simultaneous progress is described with respect to the system of the high-pressure turbine bypass control valve 119.

The arrangement of a turbine bypass system and a reheater in the power plant 100 is different from a cascade bypass system. In the power plant 100, the high-pressure turbine bypass control valve 119 is connected to the condenser 113 so that the main steam A2 generated in the drum 110 is directly discharged to the condenser 113 via the high-pressure turbine bypass control valve 119 without flowing into the reheater 112. Hereinafter, a turbine bypass system having this configuration is referred to as a "parallel bypass system". This name is derived from that the high-pressure turbine bypass control valve 119 and an intermediate-pressure turbine bypass control valve not illustrated in the drawing (intermediate-pressure turbine bypass control valve being connected to an intermediate-pressure drum not illustrated in the drawing different from the drum 110) are connected in parallel as viewed from the condenser 113. The parallel bypass system is used not only in a combined cycle power plant but also in a drum type steam power plant and the like.

The difference between both bypass systems from the viewpoint of prewarming is summarized as follows.

The cascade bypass system is also employed in a third embodiment described later, and includes a check valve 133 (see FIG. 4), which prevents a backflow of the main steam A2, on the low-temperature reheating pipe 121. Forcibly closing (performing forced closing of) the check valve 133 allows prewarming of the high-pressure turbine 103a and prewarming of the reheater 112 to be separated from each other. Further, it becomes possible to switch prewarming such that warming of the high-pressure turbine 103a alone progresses first and, thereafter, warming of the high-pressure turbine 103a and warming of the reheater 112 progress simultaneously (parallel warming).

On the other hand, such a check valve is not provided in the parallel bypass system. Accordingly, as described above, prewarming of the high-pressure turbine 103a and prewarming of the reheater 112 always progress simultaneously (parallel warming). Such a parallel bypass system is described in the first embodiment.

The power plant 100 has a rigid connection C/C and hence, the rotation number of the steam turbine 103 is increased simultaneously with the starting of the gas turbine 102. At this time, a windage loss occurs in a moving blade of the low pressure turbine 103b. Accordingly, it is necessary to cool the low pressure turbine 103b and hence, the gas feed pipe 123 is branched from an outlet of the auxiliary boiler 124, and the gas feed pipe 123 is connected to the low pressure turbine 103b. The LPCV valve 120 is provided in the gas feed pipe 123. Opening the LPCV valve 120 allows the auxiliary steam A3 to be fed to the low pressure turbine 103b so that the low pressure turbine 103b is cooled. Hereinafter, this cooling operation is referred to as "low pressure cooling".

(3) Starting Flowchart of First Comparative Example

Figure 9A:
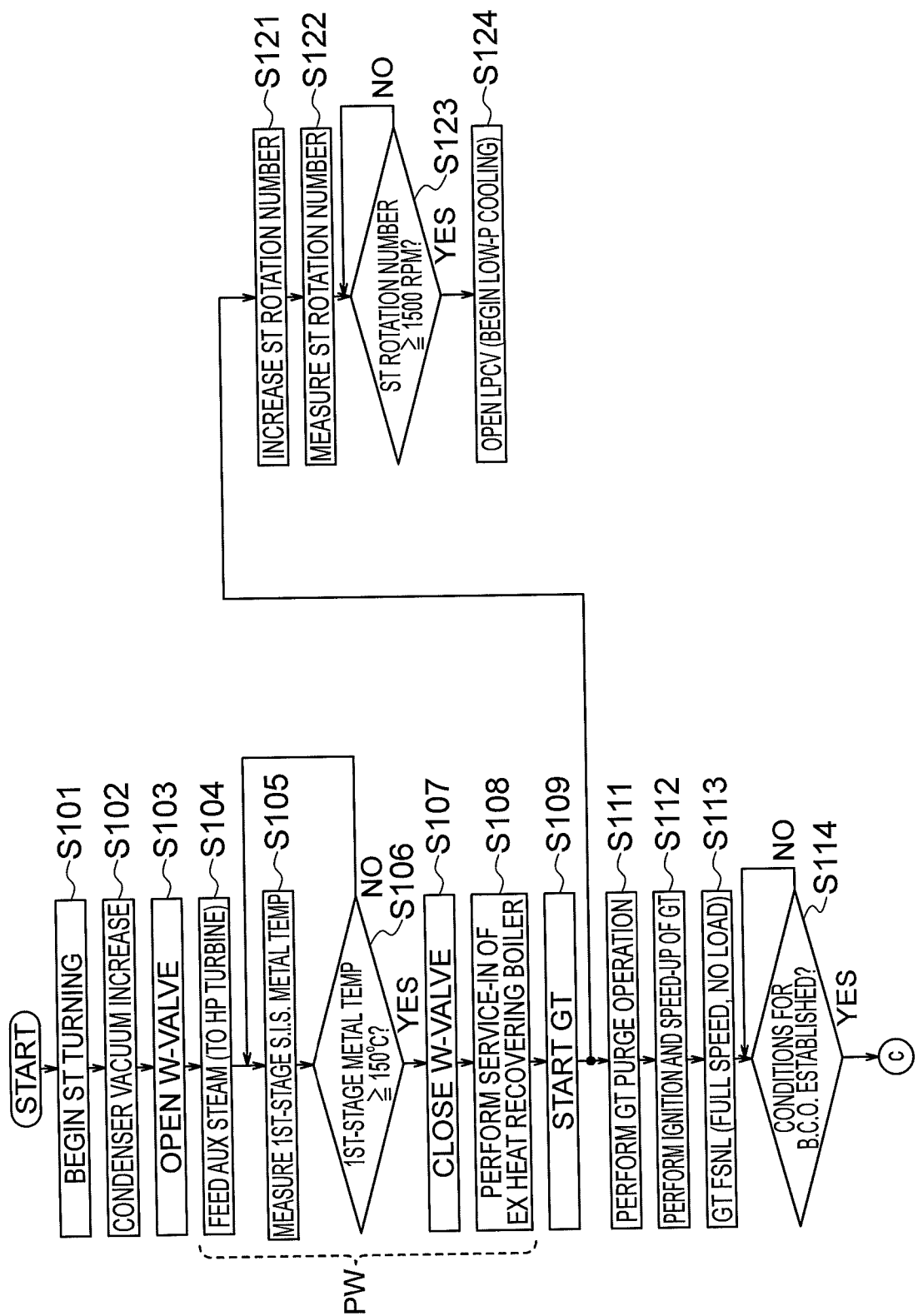
FIGS. 9A and 9B are flowcharts illustrating operation of the power plant of the first comparative example.
Figure 9B:
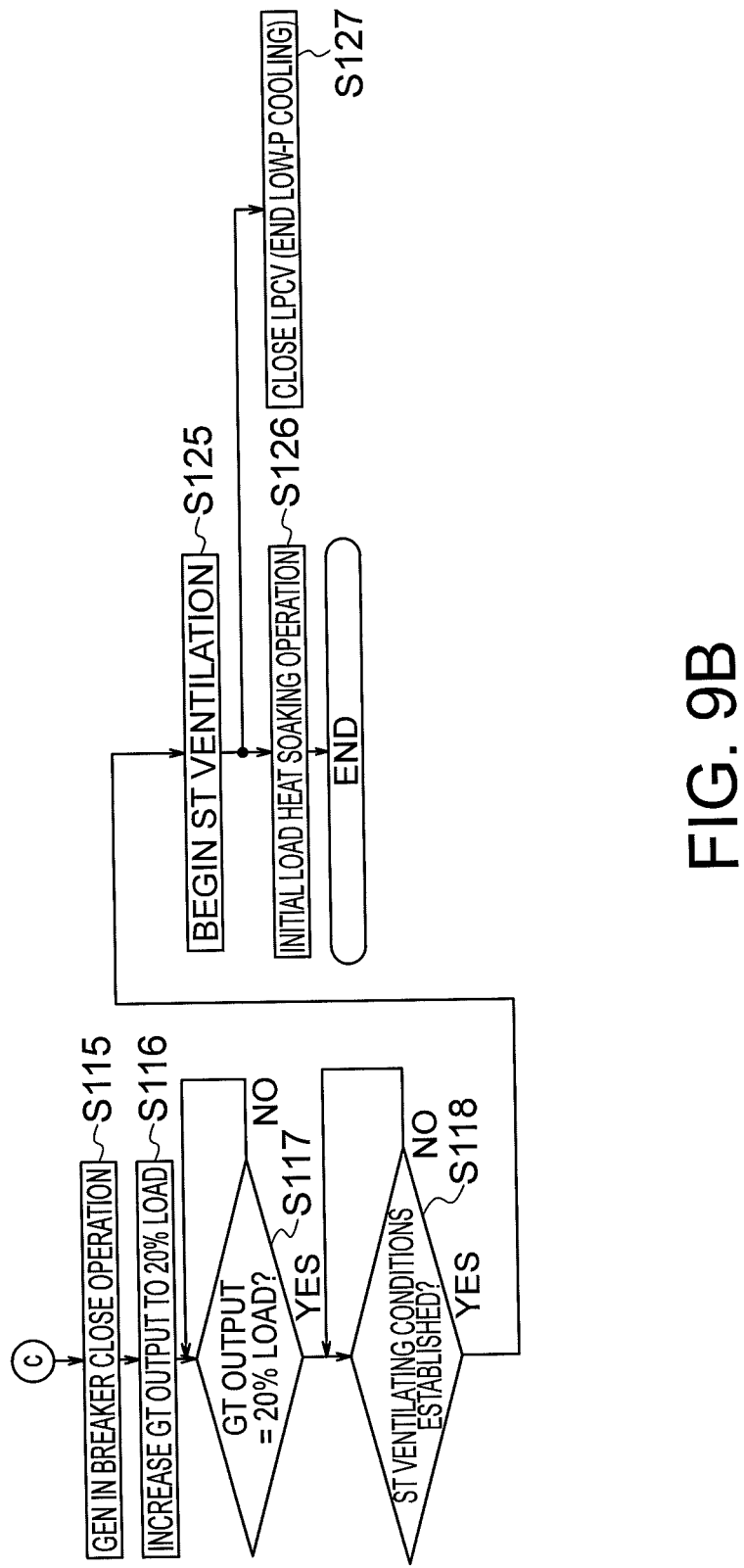

FIGS. 9A and 9B are flowcharts illustrating operation of the power plant 100 of the first comparative example. This flowchart is realized by software stored in the plant control apparatus 101. Specific numerical values used in the description made hereinafter are merely examples described for facilitating the understanding.

Preparation for starting the power plant 100 begins first by performing the turning operation of the steam turbine 103 (step S101). The steam turbine 103 is maintained at an extremely low rotation number of approximately 4 RPM to 10 RPM (revolutions per minute) by the turning operation, and this operation state allows a vacuum increase in a condenser which is performed next.

After the vacuum increase in the condenser 113 is performed (step S102), the inside of the condenser 113 is brought into a near vacuum state. In addition to the above, the reheater 112 in the parallel bypass system is connected to the condenser 113 via the reheating drain valves 128 and 129. A noncondensable gas (such as air, or a nitrogen gas in the case where nitrogen is filled) remaining in the reheater 112 is gradually discharged to the condenser 113 as the inside of the condenser 113 is brought into a vacuum state so that the inside of the reheater 112 is also brought into a near vacuum state. Holding this vacuum state allows drain water, which is to be generated in the high-pressure turbine 103a and in the reheater 112, to be suitably drained to the condenser 113 from the respective drain valves when the auxiliary steam A3 is fed for performing prewarming later.

Next, prewarming is performed. In performing prewarming, first, the warming valve 125 is opened (step S103) so as to feed the auxiliary steam A3, supplied from the auxiliary boiler 124, to the high-pressure turbine 103a and the reheater 112 (step S104). With such operation, warming of the high-pressure turbine 103a begins so that the rotor 103c gradually warms.

In the high-pressure turbine 103a, a part of the auxiliary steam A3 condenses to become drain water. This drain water is drained to the condenser 113 by the casing drain valve 130. Warming of the reheater 112 begins in parallel with this process. In the same manner, in the reheater 112, a part of the auxiliary steam A3 condenses to become drain water, and this drain water is drained to the condenser 113 by the reheating drain valves 128 and 129. FIG. 8 only illustrates, as the drain valves, the casing drain valve 130 in the high-pressure turbine 103a, and the reheating drain valves 128 and 129 disposed around the reheater 112 in a representative manner. However, a large number of drain valves not illustrated in the drawing are provided to an actual plant.

The temperature sensor TS1 measures the metal temperature of first stage shell inner surface which is the constitutional element of the rotor 103c (step S105). The metal temperature of this first stage shell inner surface is given as an index representative of the temperature of the rotor 103c, and this index determines if the rotor 103c is in a cold state or in a warming state. In an initial stage, the fed auxiliary steam A3 condenses to become drain water. In addition to the above, the rotor 103c has an extremely large heat capacity. Accordingly, the metal temperature of the first stage shell inner surface rises slowly.

The plant control apparatus 101 determines whether or not the metal temperature of the first stage shell inner surface reaches 150° C. or more (step S106). When the metal temperature of the first stage shell inner surface reaches 150° C. or more, the plant control apparatus 101 closes the warming valve 125 (step S107) to end prewarming. For the purpose of convenience of the description, it is assumed that each of the first embodiment and the first comparative example is an example of starting of prewarming which requires 3 hours from when the warming valve 125 is opened to when the metal temperature of the first stage shell inner surface reaches 150° C. or more. The first stage shell inner surface metal, which is warmed to 150° C. once as described above, is held at the 150° C. or a temperature around 150° C. without being cooled thereafter until the ventilation of the steam turbine 103 begins (step S125).

After prewarming is ended, the service initiation of the exhaust heat recovering boiler 104 (step S108) is performed. In this service initiation of the exhaust heat recovering boiler 104, a water supply pump (not illustrated in the drawing) attached to the exhaust heat recovering boiler 104 is started to supply water from the water supply pump to the drum 110, and a water level in the drum 110 is set at a predetermined value. Preparation for the exhaust heat recovering boiler 104 receiving the gas turbine exhaust gas A1 is performed as described above.

This water supply pump is a pump which supplies a large amount of water to the high-pressure drum 110 and hence, large power is required as auxiliary power for driving this water supply pump. Accordingly, in the case of the service initiation of the exhaust heat recovering boiler 104, which does not perform commercial power generation, it is taken into account to end the service initiation with a shorter time as much as possible. For example, when blowing is performed on the whole exhaust heat recovering boiler 104 for maintenance or cleaning, an action is taken, such as to complete boiler water feeding operation, before preparation for starting the power plant 100 is started. It is assumed that each of the first comparative example, the first embodiment and the like is an example of starting which requires 10 minutes for the service initiation of the exhaust heat recovering boiler 104.

When the service initiation of the exhaust heat recovering boiler is ended, the gas turbine 102 is started (step S109). When the gas turbine 102 is started, first, a purge operation is performed for 10 minutes (step S111). Thereafter, the fuel control valve 106 is opened so that the gas turbine 102 reaches 3000 RPM which is a rated speed through an ignition and speed-up step (step S112). Then, the gas turbine 102 reaches FSNL (full speed, no load) (step S113).

Simultaneously with the starting of the gas turbine 102 (step S109), the steam turbine 103 begins to increase a rotation number (step S121). The plant control apparatus 101 measures a signal from the ST rotation number detector SP1 (step S122). When the plant control apparatus 101 determines that the rotation number of the steam turbine 103 reaches 1500 RPM or more (step S123 YES), the LPCV valve 120 is opened to begin low pressure cooling (step S124). With such operations, the auxiliary steam A3 is fed to the low pressure turbine 103b so that cooling of the low pressure turbine 103b is performed. This low pressure cooling continues thereafter until the ventilation of the steam turbine 103 begins (step S125). After the ventilation is performed, the LPCV valve 120 is closed (step S127).

When a breaker-close permission condition of the generator 117 is established (step S114 YES), the generator 117 is brought into the breaker close operation (step S115). One example of the breaker-close permission condition includes a temperature condition of a catalyst for performing reduction of NOx (nitrogen oxide) contained in the gas turbine exhaust gas A1 by injecting ammonia.

After the generator 117 is brought into the breaker close operation, the output of the gas turbine 102 is increased to a 20% load (step S116). When the output of the gas turbine 102 reaches a 20% load (step S117 YES), then, the gas turbine 102 starts a load holding operation. The 20% load of the gas turbine 102 is one example of a maximum output which is allowed before the ventilation of the steam turbine 103 begins. For example, this maximum output is given as a maximum output which can perform operation where a difference in temperature of seawater, which is cooling water for the condenser 113, between an inlet and an outlet does not exceed 7° C.

After the ignition of the gas turbine 102 is performed in step S112, the gas turbine exhaust gas A1 flows into the exhaust heat recovering boiler 104, and evaporation begins in the evaporator 109 so that the main steam A2 is generated. As the output of the gas turbine 102 increases to a 20% load, a heat quantity (temperature, flow rate) of the gas turbine exhaust gas A1 also increases so that ventilating permission conditions of the steam turbine 103 are established (step S118 YES). The main constitutional elements of the ventilating conditions are the pressure condition, the flow rate condition, and the temperature condition of the main steam A2. The ventilating conditions are established when all of these conditions reach predetermined values. An example of the predetermined value is a value which allows the main steam A2 to drive the high-pressure turbine 103a. For the purpose of convenience of the description, it is assumed that each of the first comparative example and the first embodiment is an example of starting which requires 40 minutes from when the starting of the gas turbine 102 begins to when ventilating permission conditions of the steam turbine 103 are established.

When the plant control apparatus 101 determines that the ventilating permission conditions of the steam turbine 103 are established (step S118 YES), the plant control apparatus 101 begins the ventilation of the steam turbine 103 (step S125), and begins to open the MCV valve 105 and the ICV valve 118. The main steam A2 flows into the high-pressure turbine 103a via the MCV valve 105, and drives the high-pressure turbine 103a. The main steam A2 is, thereafter, exhausted from the high-pressure turbine 103a, and flows into the reheater 112 via the high-pressure turbine exhaust pipe 126 and the low-temperature reheating pipe 121. The main steam A2 is heated again to become the reheat steam A4, flows into the intermediate-pressure turbine 103b via the ICV valve 118, and drives the intermediate-pressure turbine 103b. In the parallel bypass system, steam flows into the reheater 112 after the ventilation is performed. However, prewarming of the reheater 112 is already ended simultaneously with the prewarming of the high-pressure turbine 103a. Accordingly, there arises no problem that a large amount of drain water is generated in the reheater 112.

At a time point when the ventilation begins, the steam turbine 103 is rotated at 3000 RPM which is a rated speed so that it is not necessary to perform speed-up. Accordingly, after the ventilation begins, the plant control apparatus 101 increases the degree of opening of the MCV valve 105 and the degree of opening of the ICV valve 118 to begin an initial load heat soaking operation (step S126). During the initial load heat soaking operation, for example, an inlet guide blade of the compressor 107 is controlled. Thereafter, starting steps which follows the end of the initial load heat soaking is performed.

(4) Configuration of Plant of the First Embodiment

FIG. 1 is a schematic diagram illustrating a configuration of a power plant 100a of first embodiment. The power plant 100a illustrated in FIG. 1 is a single shaft C/C power plant.

The power plant 100a illustrated in FIG. 1 includes a plant control apparatus 101a that controls operation of the power plant 100a, and further includes a clutch 131 and a gap sensor (clutch engagement detector) GS1 in addition to the constitutional elements illustrated in FIG. 8.

The plant control apparatus 101a has a function similar to the above plant control apparatus 101, but also has a function different from the plant control apparatus 101. For example, the plant control apparatus 101a can control operation of the clutch 131, and can receive a detection result of engagement of the clutch 131 from the gap sensor GS1. Other functions of the plant control apparatus 101a will be described below.

In the power plant 100a of this embodiment, the gas turbine 102 and the steam turbine 103 are connected by the clutch 131. This type of power plant is referred to as a "single shaft combined cycle power plant with clutch connection" or simply referred to as "clutch connection C/C". The clutch 131 can connect a first rotating shaft, connected to the gas turbine 102 and the generator 117, and a second rotating shaft, connected to the high-pressure turbine 103a and the intermediate/low-pressure turbine 103b, with each other, and can separate the first rotating shaft from the second rotating shaft. The gear wheel 127 for detection is provided on the second rotating shaft between the high-pressure turbine 103a and the intermediate/low-pressure turbine 103b, and the ST rotation number detector SP1 detects the rotation number of the second rotating shaft by using the gear wheel 127 for detection.

The power plant 100a illustrated in FIG. 1 and the power plant 100 illustrated in FIG. 8 are different in that this clutch 131 is present or absent. An actual structure of the clutch 131 is complicated, and FIG. 1 schematically illustrates this. At a time point when the power plant 100a begins starting, the clutch 131 is in a released state, and the gas turbine 102 and the generator 117 are precedingly started. At this time, the steam turbine 103 is in a stop state. When ventilating permission conditions of the steam turbine 103 are established, the steam turbine 103 performs speed-up starting by itself. When the steam turbine 103 speeds up to near the rated rotation number, the clutch 131 is automatically engaged by action of centrifugal force. After the clutch 131 is thus engaged, that is, during a remaining latter half of plant starting steps and normal operation, the generator 117 is driven by the gas turbine 102 and the steam turbine 103 to generate power. This is the same power generating style as a case of the power plant 100 with the rigid connection C/C illustrated in FIG. 8.

Merits of a clutch connection C/C is considered as follows. In the clutch connection C/C, when the clutch 131 is in a released state, the gas turbine 102 and the generator 117 are precedingly started. At this time, the steam turbine 103 is in a stop state or in an extremely low rotation number state and hence, prewarming can be performed during the starting of the gas turbine 102. Making use of such a point allows efficient and suitable prewarming to be realized. Further, the steam turbine 103 speeds up by itself. Accordingly, unlike the rigid connection C/C, there arises no windage loss of the low pressure turbine and low pressure cooling is not required. Therefore, it is possible to reduce inconvenience that the use of the auxiliary steam A3 is restricted in performing prewarming.

As described above, in the clutch connection C/C, prewarming can be performed even after the gas turbine 102 is started. Accordingly, in the first embodiment, the starting of the gas turbine 102 begins in the process of the prewarming, which requires a long time, without waiting for the end of the prewarming so as to attempt to start the power plant 100a earlier. To be more specific, the starting of the gas turbine 102 begins corresponding to the metal temperature of the first stage shell inner surface. At this time, the gas turbine 102 is started while the metal temperature of the first stage shell inner surface is selected such that the timing at which the prewarming is ended and the timing at which the ventilating conditions of the steam turbine 103 are established are synchronized. The function of the plant control apparatus 101a to control prewarming is one example of a warming module. Further, the function of the plant control apparatus 101a to control the starting of the gas turbine 102 and the like is one example of a starting module.

Originally, prewarming is operation which is allowed to be performed only when the high-pressure turbine 103a is in a stop state or in an extremely low rotation number state. However, in the clutch connection C/C, prewarming can be performed even after the gas turbine 102 is started. This is brought about by a starting step where the steam turbine 103 is in a stop state when the gas turbine 102 is precedingly started.

When the ventilating permission conditions of the steam turbine 103 are established, the steam turbine 103 performs speed-up starting by itself. When the steam turbine 103 speeds up to near the rated rotation number, the clutch 131 is automatically engaged by action of centrifugal force. As described above, the steam turbine 103 performs ventilation to speed up by itself and hence, unlike the rigid connection C/C, there arises no windage loss of the low pressure turbine 103b, and low pressure cooling is not required. Accordingly, the power plant 100a illustrated in FIG. 1 does not include the gas feed pipe 123 provided to the power plant 100 illustrated in FIG. 8 for performing low pressure cooling. Further, the LPCV valve 120 is not directly relevant to this embodiment and hence, the LPCV valve 120 is omitted from FIG. 1. Other configurations of the power plant 100a illustrated in FIG. 1, including system characteristic of the parallel bypass, are substantially equal to the corresponding configurations of the power plant 100 illustrated in FIG. 8.

(5) Starting Time in First Embodiment

Each of the first embodiment and the first comparative example is an example of starting which requires 3 hours for performing prewarming. In the first embodiment, the starting of the gas turbine 102 begins in advance without waiting for the end of the prewarming so that prewarming and the starting of the gas turbine 102 progress in parallel. In the parallel progress, a time point when the starting of the gas turbine 102 begins is selected such that both the timing at which the prewarming is ended and the timing at which ventilating permission conditions of the steam turbine 103 are established are synchronized.

Before the description is made in detail, (i) a time required for establishing ventilating conditions of the steam turbine, and (ii) the rate of temperature rise of the metal temperature of the first stage shell inner surface are assumed as follows.

First, with respect to (i), in the same manner as the first comparative example, assume an example of starting which requires 40 minutes from the starting of the gas turbine 102 to when ventilating permission conditions of the steam turbine 103 are established. The ventilating permission conditions in this embodiment mean conditions that all of the pressure, flow rate, and temperature of the main steam A2 reach predetermined values.

Next, with respect to (ii), the rotor 103c has an extremely large heat capacity. Accordingly, although the auxiliary steam A3 warms the surface of the rotor 103c, the heat is transferred to the inside of the rotor 103c. As a result, the rate of temperature rise of the metal temperature of the first stage shell inner surface is slow during prewarming. For the purpose of convenience of the description, it is assumed that the first embodiment is an example of starting where the rate of temperature rise is 0.2° C./min, and the metal temperature of the first stage shell inner surface rises at this rate of temperature rise. The rate of 0.2° C./min is the rate of temperature rise when the metal temperature falls within a range from 130° C. to 150° C. or around such a range. For example, in a temperature range lower than the above-mentioned range, a temperature difference (ΔT) between the temperature of the auxiliary steam A3 and the metal temperature is large so that the rate of temperature rise increases. Further, immediately after prewarming begins, that is, in a cold state in which the metal temperature is further lower, the auxiliary steam A3 is condensed to become a large amount of drain water so that the rate of temperature rise is extremely reduced.

By estimating (ii) the rate of temperature rise as described above, the rise in metal temperature of the first stage shell inner surface can be handled in the same manner as the lapse of time. For example, 40 minutes which is the time from the starting of the gas turbine 102 to when ventilating permission conditions of the steam turbine 103 are established can be converted into the metal temperature of the first stage shell inner surface.

By using such a conversion, a time point when the starting of the gas turbine 102 begins is selected as follows. That is, in this embodiment, the gas turbine 102 is started when the metal temperature of the first stage shell inner surface rises to 142° C. (142° C.=150° C.−40 minutes×0.2° C./min). With such selection, a time point when the metal temperature of the first stage shell inner surface rises to 150° C. so that the prewarming is ended and a time point when the ventilating permission conditions of the steam turbine 103 are established can be synchronized. To cause the gas turbine 102 to be started at the metal temperature of 142° C., the service initiation of the exhaust heat recovering boiler 104 also begins in advance when the metal temperature of the first stage shell inner surface rises to 140° C.

(6) Starting Flowchart of First Embodiment

Figure 2A:
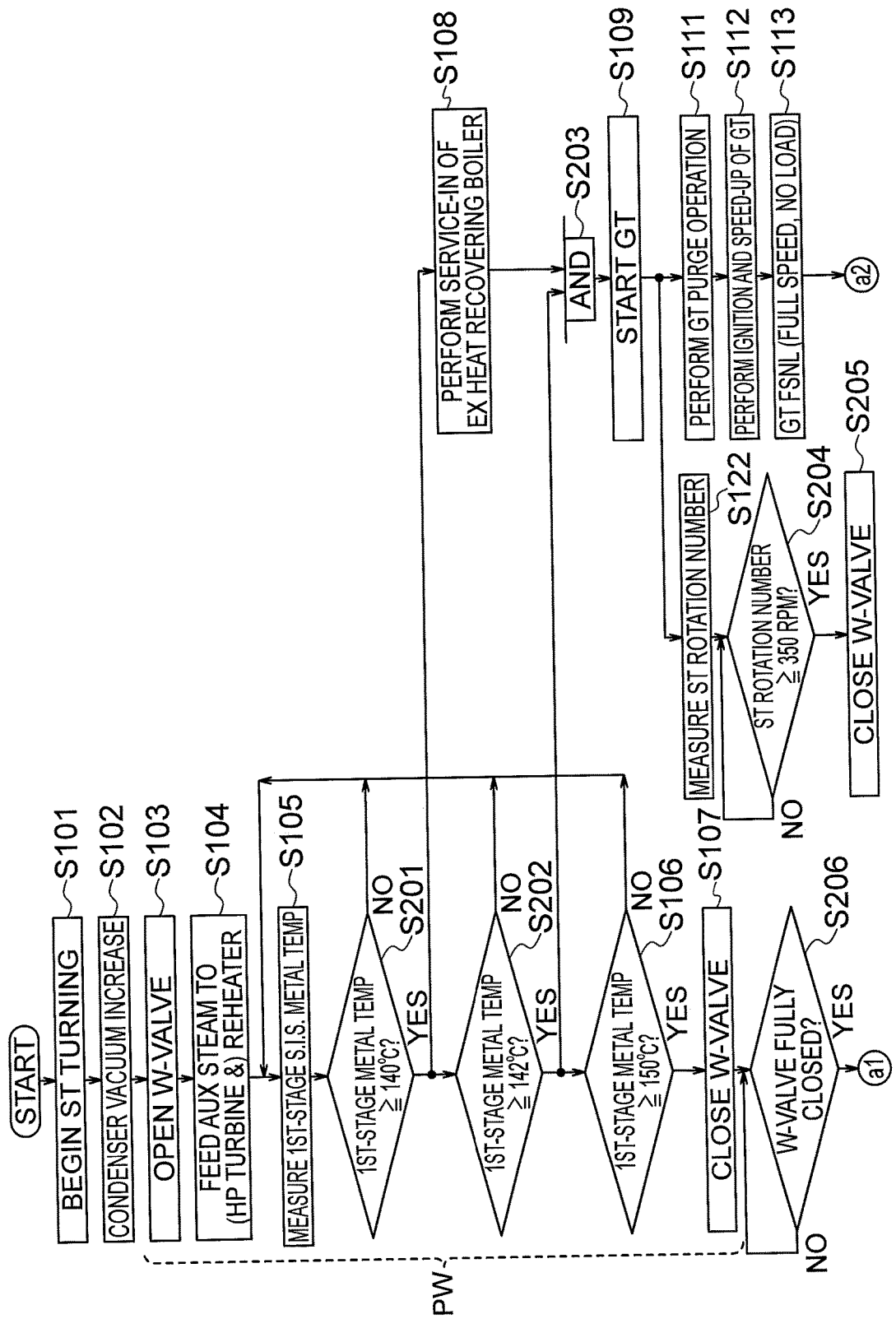
FIGS. 2A and 2B are flowcharts illustrating operation of the power plant of the first embodiment.
Figure 2B:
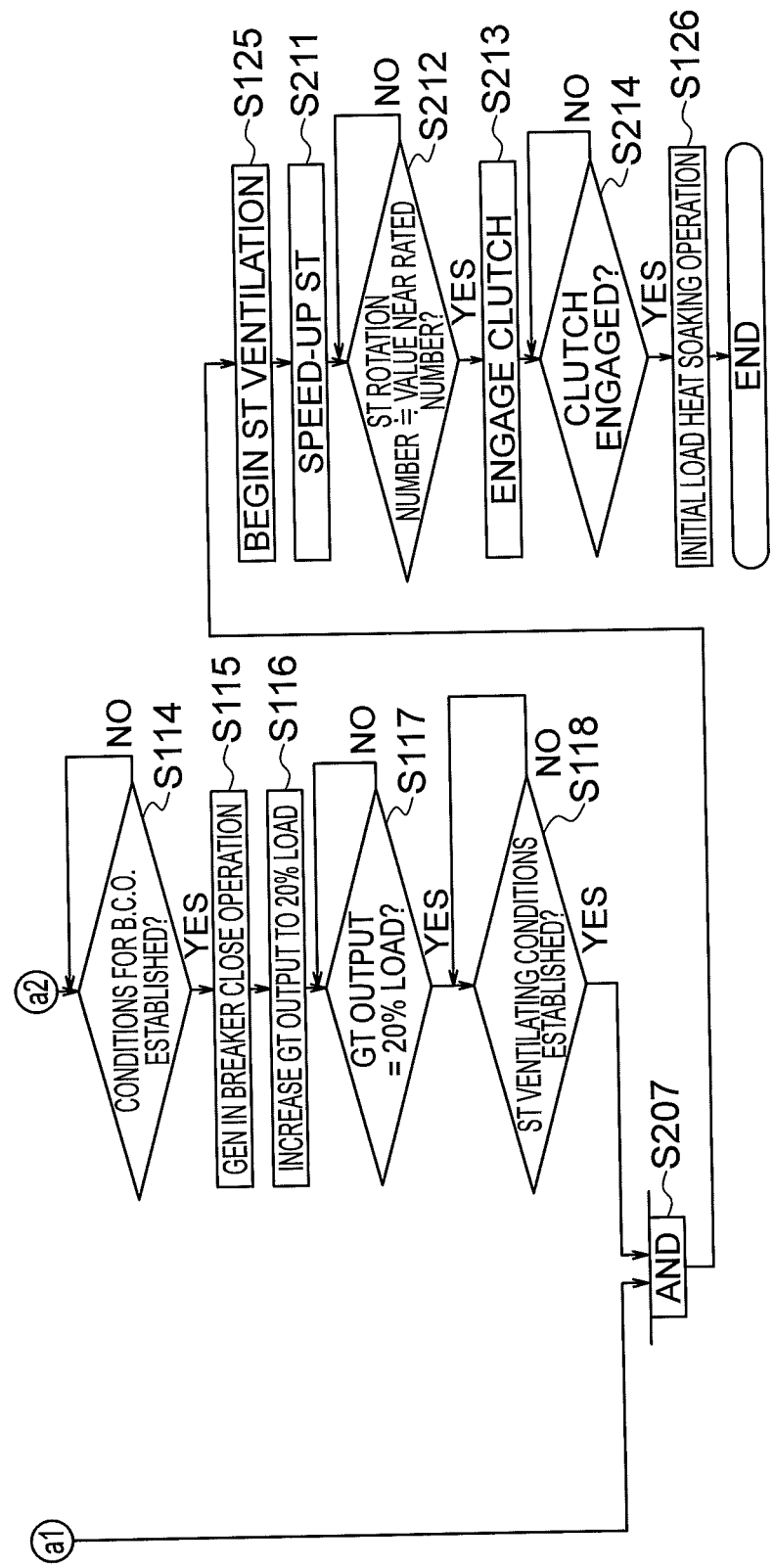

FIGS. 2A and 2B are flowcharts illustrating operation of the power plant 100a of the first embodiment. This flowchart is realized by software stored in the plant control apparatus 101a. Specific numerical values used in the description made hereinafter are merely examples described for facilitating the understanding.

Preparation for starting the power plant 100a begins first by performing the turning operation of the steam turbine 103 (step S101). The steam turbine 103 is maintained at an extremely low rotation number of approximately 4 RPM to 10 RPM by the turning operation, and this operation state allows a vacuum increase in the condenser 113.

After the vacuum increase in the condenser 113 is performed (step S102), the inside of the condenser 113 is brought into a near vacuum state. In addition to the above, the reheater 112 in the parallel bypass system is connected to the condenser 113 via the reheating drain valves 128 and 129. A noncondensable gas remaining in the reheater 112 is gradually discharged to the condenser 113 as the inside of the condenser 113 is brought into a vacuum state so that the reheater 112 is also brought into a vacuum state. Holding this vacuum state allows drain water, which is to be generated in the high-pressure turbine 103a and in the reheater 112, to be suitably drained to the condenser 113 from the respective drain valves when the auxiliary steam A3 is fed for performing prewarming later. That is, prewarming cannot be performed until this operation is ended. Accordingly, unlike the service initiation of the exhaust heat recovering boiler 104 described later, a vacuum increase in the condenser 113 cannot be performed/cannot progress in parallel with prewarming. The starting steps up to this step are substantially equal to the corresponding starting steps in the first comparative example.

Next, prewarming is performed. In performing prewarming, first, the warming valve 125 is opened (step S103) so as to feed the auxiliary steam A3, supplied from the auxiliary boiler 124, to both the high-pressure turbine 103a and the reheater 112 (step S104). With such operation, warming of the high-pressure turbine 103a begins so that the rotor 103c gradually warms. The high-pressure turbine 103a is one example of a steam turbine. The intermediate/low-pressure turbine 103b is one example of a reheat turbine. The auxiliary boiler 124 is one example of equipment different from the exhaust heat recovering boiler 104. Further, the main steam A2 and the auxiliary steam A3 are respectively examples of first steam and second steam.

In the high-pressure turbine 103a, a part of the auxiliary steam A3 condenses to become drain water. This drain water is drained to the condenser 113 by the casing drain valve 130. Warming of the reheater 112 begins in parallel with this process so that, in the reheater 112, a part of the auxiliary steam A3 condenses to become drain water. This drain water is drained to the condenser 113 by the reheating drain valves 128 and 129. This embodiment exemplifies a case where the auxiliary boiler 124 is used as an auxiliary steam source. However, in the case where another power plant is provided in an adjacent manner in addition to the power plant 100*a*, there may also be a case where another power plant is used as an auxiliary steam source, and the power plant 100*a* receives a part of steam generated by another power plant.

The temperature sensor TS1 measures the metal temperature of first stage shell inner surface which is the constitutional element of the rotor 103*c* (step S105). The plant control apparatus 101*a* determines whether or not the measured metal temperature of the first stage shell inner surface reaches 140° C. or more. When the metal temperature of the first stage shell inner surface reaches 140° C. or more (step S201 YES), the plant control apparatus 101*a* performs the service initiation of the exhaust heat recovering boiler 104 (step S108). In this service initiation, a water supply pump attached to the exhaust heat recovering boiler 104 is started to supply water from a water supply pump to the drum 110, and a water level in the drum 110 is set at a predetermined value. Preparation for the exhaust heat recovering boiler 104 receiving the gas turbine exhaust gas A1 is performed as described above. The service initiation of the exhaust heat recovering boiler 104 is a starting step which requires 10 minutes.

In the first embodiment, as already described, the starting of the gas turbine 102 begins in advance without waiting for the end of the prewarming. In addition to the above, the service initiation of the exhaust heat recovering boiler 104 also begins without waiting for the end of the prewarming. This is because the starting of the gas turbine 102 is not allowed until the service initiation of the exhaust heat recovering boiler 104 is ended and hence, the starting of the gas turbine 102 in advance cannot be also realized without performing the service initiation of the exhaust heat recovering boiler 104 in advance. Further, this can be realized because the starting step per se of the service initiation of the exhaust heat recovering boiler 104 does not consume the auxiliary steam A3 and hence, there is no restriction on the use of the auxiliary steam A3 so that the starting step of the service initiation of the exhaust heat recovering boiler 104 can be performed in parallel with the prewarming.

Figure 5:
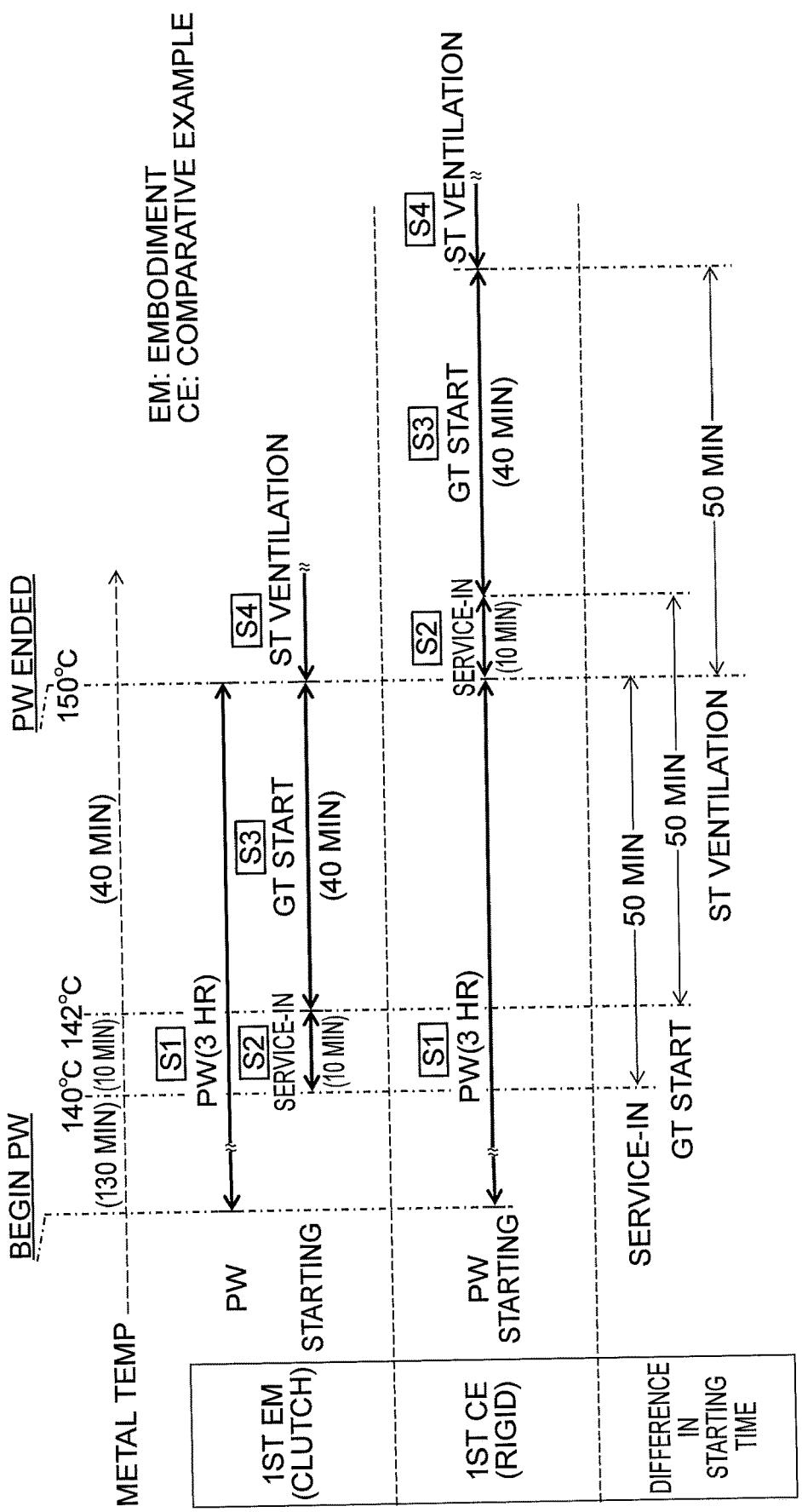
FIG. 5 is a chart for comparing the first embodiment with a first comparative example.

The starting of the gas turbine 102 is expected to begin when the metal temperature of the first stage shell inner surface rises to 142° C. By taking into account, in addition to the above, 10 minutes which is the time required for performing the service initiation of the exhaust heat recovering boiler 104, it is sufficient to begin the service initiation of the exhaust heat recovering boiler 104 when the metal temperature of the first stage shell inner surface reaches 140° C. (140° C.=142° C.−10 minutes×0.2° C./min). With such a configuration, service initiation in this embodiment begins 50 minutes earlier than that in the first comparative example in which the service initiation begins when the metal temperature of the first stage shell inner surface reaches 150° C. (when prewarming is ended). FIG. 5 described later illustrates that there is a 50 minute difference in starting time of the service initiation of the exhaust heat recovering boiler 104 between this embodiment and the first comparative example.

Thereafter, after a lapse of 10 minutes, the service initiation of the exhaust heat recovering boiler 104 is ended. Simultaneously with the end of the service initiation, the metal temperature of the first stage shell inner surface reaches 142° C. After the plant control apparatus 101*a* confirms that the metal temperature of the first stage shell inner surface reaches 142° C. or more (step S202 YES), as a precaution, the plant control apparatus 101*a* also confirms that the service initiation of the exhaust heat recovering boiler 104 is ended by AND gate process (step S203). Then, the plant control apparatus 101*a* starts the gas turbine 102 (step S109). The temperature of 142° C. is one example of a predetermined temperature.

When the gas turbine 102 is started, first, a purge operation is performed for 10 minutes (step S111). Thereafter, the fuel control valve 106 is opened so that the gas turbine 102 reaches 3000 RPM which is a rated speed through an ignition and speed-up step (step S112). Then, the gas turbine 102 reaches FSNL (full speed, no load) (step S113). The clutch 131 is in a released state in this series of starting steps and hence, the steam turbine 103 is in a stop state even after the gas turbine 102 and the generator 117 are started.

In the first comparative example, the steam turbine 103 begins to increase a rotation number simultaneously with the starting of the gas turbine 102. Accordingly, prewarming is ended and the warming valve 125 is fully closed and, thereafter, the starting of the gas turbine 102 is performed. On the other hand, in this embodiment, as described above, the starting of the gas turbine 102 can be performed while prewarming is continued. FIG. 5 illustrates that performing this parallel progress of starting and prewarming of the gas turbine allows the starting of the gas turbine 102 in this embodiment to be performed 50 minutes earlier than the starting of the gas turbine 102 in the first comparative example. Further, low pressure cooling (which consumes a large amount of the auxiliary steam A3) which becomes necessary to be performed with an increase in rotation number of the steam turbine 103 in the first comparative example is also unnecessary in this embodiment. This also causes parallel progress of starting and prewarming of the gas turbine to be easily performed in this embodiment from a viewpoint of burden on the auxiliary boiler 124.

Instead, it is noted that the steam turbine 103 causes idling phenomenon at approximately 100 RPM to 300 RPM due to "co-rotation". The "co-rotation" is described hereinafter.

As has been already described, when the gas turbine 102 is started, the clutch 131 is in a released state, and the steam turbine 103 is in a stop state at this time. However, when the behavior of the steam turbine 103 is precisely described, although the steam turbine 103 is in a stop state (in a state in which ventilation is not performed), lubricating oil used on the gas turbine 102 side flows into the clutch 131 and hence, a torque is transmitted to the steam turbine 103 side. Accordingly, when the gas turbine 102 performs speed-up starting, the steam turbine 103 also idles at a rotation number of 100 RPM to 300 RPM along with the speed-up starting. Such a phenomenon is referred to as "co-rotation". Prewarming is operation which is allowed to be performed only when the high-pressure turbine 103*a* is in a stop state or in a low rotation number state. From this viewpoint, serious frictional heat which may cause a problem is not generated even when the auxiliary steam A3 is fed during the rotation at 100 RPM to 300 RPM. In other words, a rotation number of approximately 300 RPM sufficiently falls within a range of low rotation number which allows prewarming. Accordingly, there arises no problem even if prewarming is performed in a co-rotation state.

However, for a case where the rotation number of the steam turbine 103 becomes a rotation number which exceeds estimated 300 RPM due to some reasons, the plant control apparatus 101*a* measures a signal from the ST rotation number detector SP1 (step S122). When the plant control apparatus 101*a* determines that the measured rotation number of the steam turbine 103 is 350 RPM or more (step S204 YES), the plant control apparatus 101*a* closes the warming valve 125 (step S205) so as to interrupt the prewarming. This rotation number of 350 RPM is a value which is obtained by adding a margin of 50 RPM to the above-mentioned 300 RPM. The rotation number of 350 RPM is one example of a predetermined rotation number.

When a breaker-close permission condition of the generator 117 are established (step S114 YES), the generator 117 is brought into the breaker close condition (step S115). An example of the breaker-close permission condition includes a temperature condition of a catalyst for performing reduction of NOx (nitrogen oxide), contained in the gas turbine exhaust gas A1, by injecting ammonia.

After the generator 117 is brought into the breaker close condition, the output of the gas turbine 102 is increased to a 20% load (step S116). When the output of the gas turbine 102 reaches a 20% load (step S117 YES), the gas turbine 102 starts a load holding operation. The 20% load of the gas turbine 102 is one example of a maximum output which is allowed before the ventilation of the steam turbine 103 begins. For example, the 20% load is given as a maximum output which can perform operation where a difference in temperature of seawater, which is cooling water for the condenser 113, between an inlet and an outlet does not exceed 7° C. It may be also considered that the gas turbine 102 with clutch connection C/C is started in advance so as to bring the gas turbine 102 into a rated output state (100% load), and the steam turbine 103 is started at a later point in such a state. However, from the viewpoint of protecting the environment, it is generally difficult to employ this starting method in the power plant 100a having the regulations on the difference in temperature of seawater between the inlet and the outlet of the condenser 113.

Ventilating permission conditions of the steam turbine 103 are established (step S118 YES) after a lapse of 40 minutes from the starting of the gas turbine 102 in step S109. The main constitutional elements of the ventilating conditions in this embodiment are the pressure condition, the flow rate condition, and the temperature condition of the main steam A2. The ventilating conditions are established when all of these conditions reach predetermined values. An example of the predetermined value is a value which allows the main steam A2 to drive the high-pressure turbine 103a. It may be also considered to set the ventilating conditions in this embodiment such that the ventilating conditions are established when some of the pressure, flow rate, and temperature of the main steam A2 reach the predetermined values.

Simultaneously with the establishment of the ventilating conditions, the metal temperature of the first stage shell inner surface, which is 142° C. when the gas turbine 102 is started, reaches 150° C. after a lapse of 40 minutes. After the plant control apparatus 101a confirms that the metal temperature of the first stage shell inner surface reaches 150° C. or more (step S106 YES), the plant control apparatus 101a closes the warming valve 125 (step S107) so as to end the prewarming. The temperature of 150° C. is one example of a predetermined temperature.

That is, in this embodiment, the timing at which the prewarming is ended and the timing at which the ventilating conditions of the steam turbine 103 are established so that ventilation of the steam turbine 103 is allowed are synchronized. Accordingly, the ventilation of the steam turbine 103 (step S125) is rapidly started at this timing.

Depending on the power plant 100a, to guarantee more reliable warming, there may be also a case where prewarming is ended after a lapse of a predetermined time from when the metal temperature of the first stage shell inner surface reaches 150° C. or more. A second embodiment described later describes a starting method of this case.

The plant control apparatus 101a determines, by an AND gate process (step S207), both of that ventilating permission conditions of the steam turbine 103 are established (step S118 YES) and that the warming valve 125 is fully closed (step S206 YES). When both of these conditions are established, the plant control apparatus 101a begins the ventilation of the steam turbine 103 (step S125), and opens the MCV valve 105 and the ICV valve 118. The steam turbine 103 is started as described above. Referring to FIG. 5, it can be understood that ventilation in this embodiment begins 50 minutes earlier than when ventilation of the steam turbine in the first comparative example begins.

When the ventilation begins, the main steam A2 flows into the high-pressure turbine 103a via the MCV valve 105, and drives the high-pressure turbine 103a. The main steam A2 is, thereafter, exhausted from the high-pressure turbine 103a, and flows into the reheater 112 via the high-pressure turbine exhaust pipe 126 and the low-temperature reheating pipe 121. The main steam A2 is heated again to become the reheat steam A4, flows into the intermediate-pressure turbine 103b via the ICV valve 118, and drives the intermediate-pressure turbine 103b. After the ventilation begins, the plant control apparatus 101a controls the degrees of openings of the MCV valve 105 and the ICV valve 118 to speed up the steam turbine 103 (step S211) so that the rotation number of the steam turbine 103 increases toward the rated speed (3000 RPM).

When the rotation number of the steam turbine 103 increases to a value near this rated speed (step S212 YES), the clutch 131 is automatically engaged by action of centrifugal force (step S213). This engagement is performed simply due to mechanical mechanism which the clutch 131 per se has, but not by action of controls performed by the plant control apparatus 101a. After the clutch 131 is engaged, the generator 117 is driven by the gas turbine 102 and the steam turbine 103 to generate power. The steps which follow thereafter adopt the same power generating style as the rigid connection C/C.

The gap sensor GS1 is an engagement detector which detects whether or not the clutch 131 is engaged. When the plant control apparatus 101a receives a signal from the gap sensor GS1 and determines that the clutch 131 is engaged (step S214 YES), the plant control apparatus 101a increases the degrees of openings of the MCV valve 105 and the ICV valve 118 so as to start initial load heat soaking operation of the steam turbine 103 (step S126). During the initial load heat soaking operation, for example, an inlet guide blade of the compressor 107 is controlled. Thereafter, starting steps which follow the end of the initial load heat soaking are performed.

(7) First Advantageous Effect of First Embodiment

In the first embodiment, the service initiation of the exhaust heat recovering boiler 104 (step S108), the starting of the gas turbine 102 (step S109), and the beginning of the ventilation of the steam turbine 103 (step S125) are started respectively when measured values of the metal temperature of the first stage shell inner surface reach 140° C., 142° C., and 150° C. With such a configuration, each of these operations is performed 50 minutes earlier in the first embodiment than those in the first comparative example. With regard to performing these three operations earlier, it may be safe to say that performing the service initiation of the exhaust heat recovering boiler 104 and the starting of the gas turbine 102 earlier is a requirement for allowing the ventilation of the steam turbine 103 to begin earlier. Accordingly, from the viewpoint of starting the plant earlier, it can be summarized that the advantageous effect of this embodiment is to begin the ventilation of the steam turbine 103 earlier.

FIG. 5 is a chart for comparing the first embodiment with the first comparative example, and is also a chart prepared for directly visualizing that the ventilation of the above-described steam turbine 103 begins earlier.

In FIG. 5, keeping in mind that time is described using prewarming (PW) as the reference will facilitate the understanding (see reference numeral S1). To be more specific, the first comparative example and the first embodiment have the same beginning time and end time of the prewarming. Accordingly, it is possible to perform the comparison from the viewpoint of the degree of delay of the beginning of the ventilation of the steam turbine 103 from the end of the prewarming (see reference numeral S4).

As illustrated in FIG. 5, in the first comparative example, the ventilation of the steam turbine 103 begins after 50 minutes from the end of the prewarming. On the other hand, in the first embodiment, the ventilation of the steam turbine 103 begins simultaneously with the end of the prewarming. That is, the plant is started 50 minutes earlier in the first embodiment than in the first comparative example. This can be realized because, in this embodiment, by taking advantage of the merit of the clutch connection C/C, the step of starting the gas turbine 102 and the step of performing service initiation of the exhaust heat recovering boiler 104 progress in parallel with prewarming (see reference numerals S2, S3).

Further, it is noteworthy that to start the plant 50 minutes earlier than the first comparative example is substantially equal to an advantageous effect which can be acquired when the prewarming which requires 180 minutes (3 hours) in the first comparative example is shortened to 130 minutes. As described above, although various attempts to shorten a prewarming time have been performed, it is difficult to shorten the prewarming time in practice. Actually, also in FIG. 5, both the first comparative example and the first embodiment equally require 3 hours for the prewarming step, and both the first comparative example and the first embodiment perform the prewarming per se in the same manner. However, according to this embodiment, the step of starting the gas turbine 102 and the step of performing service initiation of the exhaust heat recovering boiler 104 progress in parallel with prewarming and hence, the time associated with the prewarming can be actually shortened to 72% (72[%]=130 minutes/180 minutes).

(8) Second Advantageous Effect of First Embodiment

Further, in the first embodiment, when prewarming and the starting of the gas turbine 102 progress in parallel, a time point when the starting of the gas turbine 102 begins is selected such that the timing at which the prewarming is ended and the timing at which ventilating permission conditions of the steam turbine 103 are established are synchronized. Hereinafter, advantageous effects which can be acquired by such configuration are discussed.

As an approach to the discussion, parallel progress equal to the parallel progress in this embodiment is performed. This embodiment is compared with two starting methods (second and third comparative examples) where above-mentioned both timings are not synchronized. In the same manner as that the beginning time and end time of the prewarming in this embodiment are synchronized with the beginning time and end time of the prewarming in the first comparative example in FIG. 5, it is assumed that the beginning time and end time of the prewarming in the second and third comparative examples are equal to that in this embodiment. Accordingly, it is possible to perform the comparison between the first embodiment and the second and third comparative examples from the viewpoint of the degree of advance or delay of the beginning of the ventilation of the steam turbine 103 from the end of the prewarming. For example, it is possible to describe that the ventilation of the steam turbine 103 begins simultaneously with the end of the prewarming in the first embodiment.

(9) Second Comparative Example

The second comparative example is a starting method where ventilating permission conditions of the steam turbine 103 are established (ventilating permission is established) with a delay from the end of the prewarming. For the purpose of convenience of the description, it is assumed that the second comparative example is an example of starting where, in step S202, the threshold of the metal temperature of the first stage shell inner surface is changed to a higher temperature (145° C., for example) from 142° C. in the first embodiment. Accordingly, in the second comparative example, the starting of the gas turbine 102 (step S109) begins when the metal temperature reaches 145° C.

With such a configuration, in the second comparative example, the starting of the gas turbine 102 begins with a delay of 15 minutes compared with the first embodiment and hence, the establishment of the ventilating permission is also delayed by 15 minutes (15 minutes=[145° C.−142° C.]/0.2° C./min). Accordingly, in the second comparative example, the ventilation of the steam turbine 103 begins after 15 minutes from the end of the prewarming. This means that the plant starting is delayed by 15 minutes compared with the first embodiment and hence, in the second comparative example, the gain which can be acquired by starting a plant earlier is reduced by 15 minutes.

(10) Third Comparative Example

The third comparative example is a starting method where ventilating permission conditions of the steam turbine 103 are established (ventilating permission is established) earlier than the end of the prewarming. For the purpose of convenience of the description, it is assumed that the third comparative example is an example of starting where, in step S202, the threshold of the metal temperature of the first stage shell inner surface is changed to a lower temperature (139° C., for example) from 142° C. in the first embodiment. Accordingly, in the third comparative example, the starting of the gas turbine 102 (step S109) begins when the metal temperature reaches 139° C.

With such a configuration, in the third comparative example, the starting of the gas turbine 102 begins 15 minutes earlier compared with the first embodiment and hence, the establishment of the ventilating permission is also 15 minutes earlier (15 minutes=[142° C.−139° C.]/0.2° C./min). However, the ventilation of the steam turbine 103 is not allowed to begin until prewarming is ended and hence, eventually, in the third comparative example, the ventilation of the steam turbine 103 begins simultaneously with the end of the prewarming. This starting is equal to the plant starting in the first embodiment and hence, the gain which can be acquired by starting a plant earlier is equal to the gain in the first embodiment.

However, from the viewpoint of economic efficiency as a commercial power plant, the starting method in the third comparative example is not recommendable. This is because, even after the ventilating permission is established, it is necessary to wait the end of the prewarming for 15 minutes while the output of the gas turbine 102 is held at 20% load. This means that partial load (gas turbine partial load operation) having low plant thermal efficiency is required to perform for additional 15 minutes.

In view of the above, none of advanced or delayed establishment of the ventilating permission conditions of the steam turbine 103 and advanced or delayed end of the prewarming cannot form an optimum starting method. From the viewpoint of starting a plant earlier and the viewpoint of economic efficiency which a commercial machine is required to have, it is safe to say that the first embodiment is a starting method where the timing at which ventilating permission conditions of the steam turbine 103 are established and the timing at which the prewarming is ended are synchronized so that it is possible to acquire the maximum merits brought about by the parallel progress by the clutch connection C/C.

(11) Plant to which First Embodiment is Applicable

The power plant 100a of the first embodiment is a single shaft combined power plant of the clutch connection C/C type having a parallel bypass. However, this embodiment is also applicable to a combined cycle power plant of another manner. As described above, prewarming is operation which is allowed to be performed only when the high-pressure turbine 103a is in a stop state or in a low rotation number state in which frictional heat due to the auxiliary steam A3 causes no problem.

On the other hand, a multi-axial combined cycle power plant includes a plurality of gas turbines which are provided to different rotating shafts, and one steam turbine which is provided to a rotating shaft different from the above-mentioned rotating shafts. With such a configuration, even after these gas turbines are started, it is possible to bring the steam turbine into a stop state. Accordingly, the starting process of this embodiment is also applicable to the multi-axial combined cycle power plant.

A power plant is also known which includes one gas turbine and one steam turbine which are provided to different rotating shafts. Also in this power plant, the steam turbine can be brought into a stop state after the gas turbine is started. Accordingly, the starting process of this embodiment is also applicable to this power plant.

It can be also considered to apply the starting process of this embodiment in the rigid connection C/C. For example, it is possible to consider a starting method where only the service initiation of the exhaust heat recovering boiler progresses in parallel with the prewarming. A time point when the service initiation of the exhaust heat recovering boiler begins is selected such that the timing at which the prewarming is ended and the timing at which the starting of the gas turbine begins are synchronized. However, a time required for the service initiation of the exhaust heat recovering boiler is approximately 10 minutes and hence, the gain which can be acquired through this starting method by starting a plant earlier is approximately 10 minutes. Accordingly, when it is required to start the plant even 10 minutes earlier, it is desirable to apply the starting process of this embodiment to the rigid connection C/C.

(12) First Embodiment and BOP Equipment

In the first embodiment, the service initiation of the exhaust heat recovering boiler 104 and the starting of the gas turbine 102 begin respectively when the metal temperature of the first stage shell inner surface reaches 140° C. and 142° C., and prewarming and these two steps progress in parallel. In this embodiment, such parallel progress may also be used in other cases. Examples of such parallel progress are described hereinafter.

The gas turbine 102 and the exhaust heat recovering boiler 104 illustrated in FIG. 1 are representative constitutional elements of the power plant 100a. However, an actual combined cycle power plant further includes complicated apparatuses and equipment referred to as BOP (Balance of Plant) equipment in many cases. The plant control apparatus 101a is also required to start (or operate) the BOP equipment before or after the starting of the gas turbine 102.

For example, a stack damper is opened so as to make a stack and the exhaust heat recovering boiler 104 communicate with each other. Further, a disconnector of the generator 117 is closed for preparing a power transmission line which transmits power generated by the generator 117 therethrough. Usually, the BOP equipment is started in conjunction with the starting of the gas turbine 102 or the service initiation of the exhaust heat recovering boiler 104. For example, when the plant control apparatus 101a determines that the gas turbine 102 which corresponds to a master unit is started, BOP equipment forming a slave unit is started in an interlocking manner with the master unit.

Alternatively, in this embodiment, the BOP equipment may be started corresponding to the metal temperature of the first stage shell inner surface. In this embodiment, an EHC (Electric Hydraulic Control) control oil pump is taken as one example of the above.

For example, the plant control apparatus 101a starts the EHC control oil pump when the plant control apparatus 101a determines that the metal temperature of the first stage shell inner surface reaches 138° C. In this case, the EHC control oil pump is started 20 minutes before the starting of the gas turbine 102 begins (20 minutes=[142° C.–138° C.]/0.2° C./min). During the 20 minutes, the EHC control oil pump stirs control oil in a tank to increase the temperature of the control oil to a proper temperature and hence, the starting of the gas turbine 102 can be started while suitable viscosity of the control oil is ensured. The pump operation of 20 minute is sufficient for treating the temperature or viscosity of the control oil. Accordingly, even if the pump is operated for 20 minutes or more, motor power of the oil pump is only wasted, and the lifespan of an apparatus is only reduced. In view of the above, the starting process of this embodiment is applied to the starting of the EHC control oil pump. In such a case, a future starting step (when the starting of the gas turbine 102 begins in this embodiment) can be predicted by using a metal temperature as an index and hence, the starting timing of the EHC control oil pump can be optimized.

(13) Advantageous Effect and Problem of First Embodiment

As described above, in this embodiment, the starting of the gas turbine 102 and the like begins during a period where the high-pressure turbine 103a and the like is warmed by performing prewarming. With such a configuration, according to this embodiment, the power plant 100a which includes the gas turbine 102 and the high-pressure turbine 103a can perform both warming and early starting.

Further, in this embodiment, by estimating the rate of temperature rise of the metal temperature of the first stage shell inner surface (0.2° C./min, for example), various equipment of the power plant 100a can be started at optimum timings corresponding to the metal temperature of the first stage shell inner surface.

In the first embodiment, it is desirable to increase accuracy of this rate of temperature rise. For example, when an actual rate of temperature rise is higher than 0.2° C./min which is the estimated rate of temperature rise, the ventilating permission is established with a delay from the end of the prewarming as in the case of the second comparative example. On the other hand, when an actual rate of temperature rise is lower than 0.2° C./min which is the estimated rate of temperature rise, ventilating permission conditions of the steam turbine are established earlier than the end of the prewarming as in the case of the third comparative example. The second embodiment described later can cope with this problem, for example.

Second Embodiment

Hereinafter, a second embodiment is described. A fourth comparative example is also described in the description of this embodiment.

(1) Prewarming in Second Embodiment

Prewarming in the first embodiment and the first comparative example is ended when the metal temperature of the first stage shell inner surface reaches 150° C. or more. On the other hand, prewarming in the second embodiment is ended when the metal temperature of the first stage shell inner surface reaches 150° C. or more, and a state in which the metal temperature is 150° C. or more continues for a predetermined time.

In this embodiment, the prewarming is ended after a lapse of a waiting time of a predetermined time. The reason is as follows. The metal temperature of the first stage shell inner surface is a temperature measured by the temperature sensor TS1. The temperature sensor TS1 measures the temperature of the surface of the rotor 103c which comes into contact with the auxiliary steam A3, and the temperature of the surface of the rotor 103c rises relatively rapidly during the prewarming. On the other hand, the temperature of the inside of the rotor 103c which does not come into direct contact with the auxiliary steam A3 rises slowly due to heat transfer from the surface. Accordingly, even after the metal temperature of the first stage shell inner surface (the surface of the rotor) reaches 150° C., the inside of the rotor is still in a low temperature state of less than 150° C.

The above-mentioned waiting time is a time for waiting for the inside of the rotor reaching 150° C. This waiting time conflicts with early starting of the plant. However, in many cases, emphasis is placed on the idea that the rotor including the inside thereof is sufficiently warmed so as to reliably start the high-pressure turbine 103a. Accordingly, it is more often the case where prewarming is ended with a waiting time as in the case of the second embodiment compared with the case where prewarming is ended without a waiting time as in the case of the first embodiment.

This waiting time varies corresponding to a size (capacity) or a material of the high-pressure turbine 103a. The waiting time is generally selected from between 1 hour and 3 hours in many cases. For the purpose of convenience of the description, in the second embodiment, it is assumed that the prewarming is ended when the metal temperature of the first stage shell inner surface reaches 150° C. or more, and a state in which the metal temperature is 150° C. or more continues for 1 hour (60 minutes).

(2) Starting Time in Second Embodiment

The second embodiment is applied to the power plant 100a illustrated in FIG. 1. Accordingly, it is assumed that the second embodiment is an example of starting where a time required for the plant starting is equal to that in the first embodiment, and 40 minutes is required for a period from the starting of the gas turbine 102 to when ventilating permission conditions of the steam turbine 103 are established.

The second embodiment is an example of starting which requires 4 hours for performing prewarming. The breakdown of the time is as follows. 3 hours is required from when prewarming begins to when the metal temperature of the first stage shell inner surface reaches 150° C. and, than, it is required to wait for 1 hour, which is the above-mentioned waiting time. Accordingly, 4 hours is required in total.

(3) Summary of Second Embodiment

Points which are changed from the first embodiment in the second embodiment are as follows.

The gas turbine 102 in the first embodiment is started when the metal temperature of the first stage shell inner surface reaches 142° C. or more. On the other hand, the gas turbine 102 in the second embodiment is started when the metal temperature of the first stage shell inner surface reaches 150° C. or more, and a state in which the metal temperature is 150° C. or more continues for a predetermined time (20 minutes, for example).

The prewarming in the second embodiment is ended after 40 minutes from the starting of the gas turbine 102 (60 minutes−20 minutes). Accordingly, starting the gas turbine 102 at this timing allows the timing at which the prewarming is ended and the timing at which ventilating permission conditions of the steam turbine 103 are established (established after 40 minutes from the starting of the gas turbine 102) to be synchronized.

Further, in the first embodiment, the service initiation of the exhaust heat recovering boiler 104 begins when the metal temperature of the first stage shell inner surface reaches 140° C. or more. On the other hand, in the second embodiment, the service initiation of the exhaust heat recovering boiler 104 begins when the metal temperature of the first stage shell inner surface reaches 150° C. or more, and a state in which the metal temperature is 150° C. or more continues for a predetermined time (10 minutes, for example).

(4) Starting Flowchart of Second Embodiment

Figure 3A:
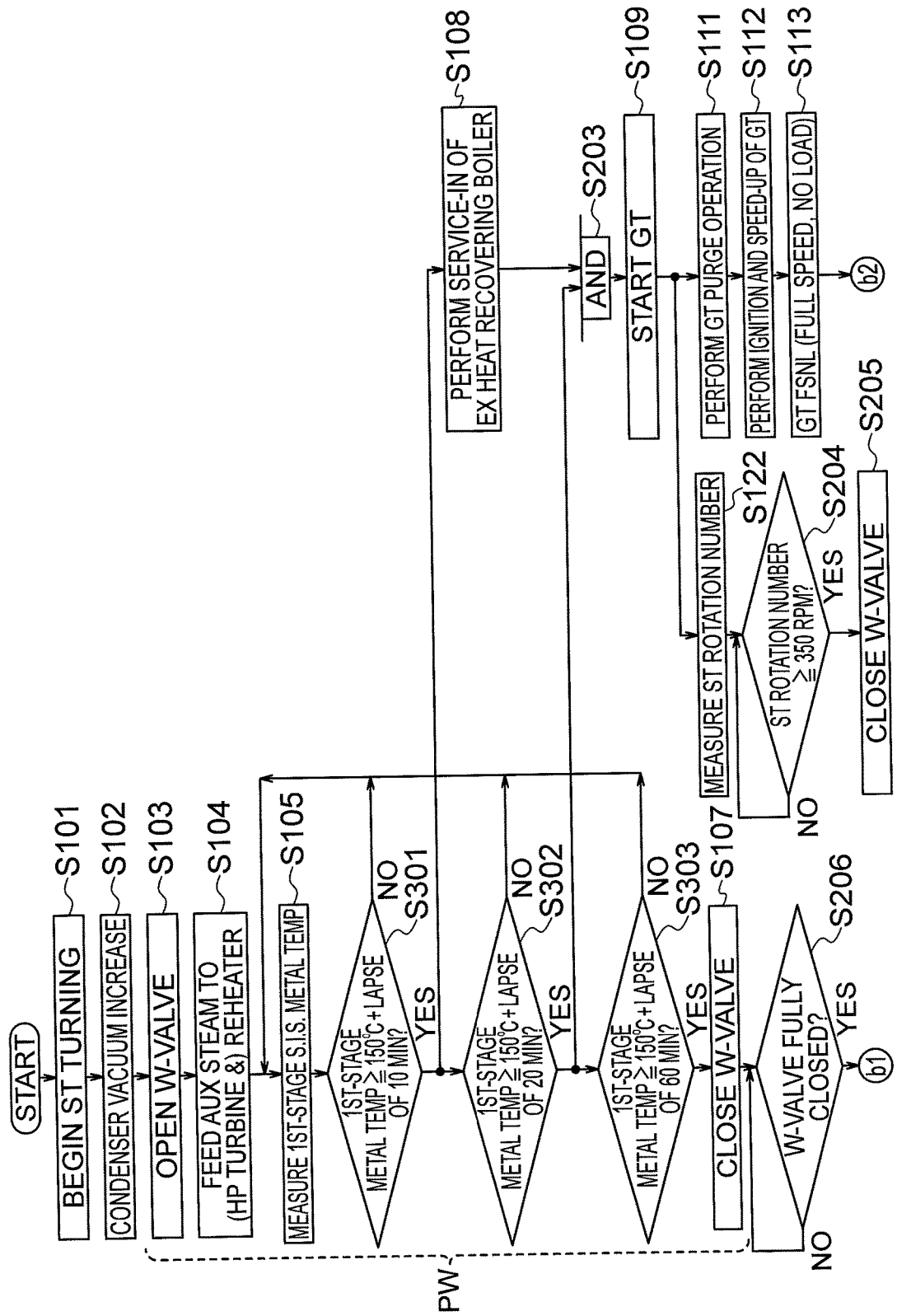
FIGS. 3A and 3B are flowcharts illustrating operation of a power plant of a second embodiment.
Figure 3B:
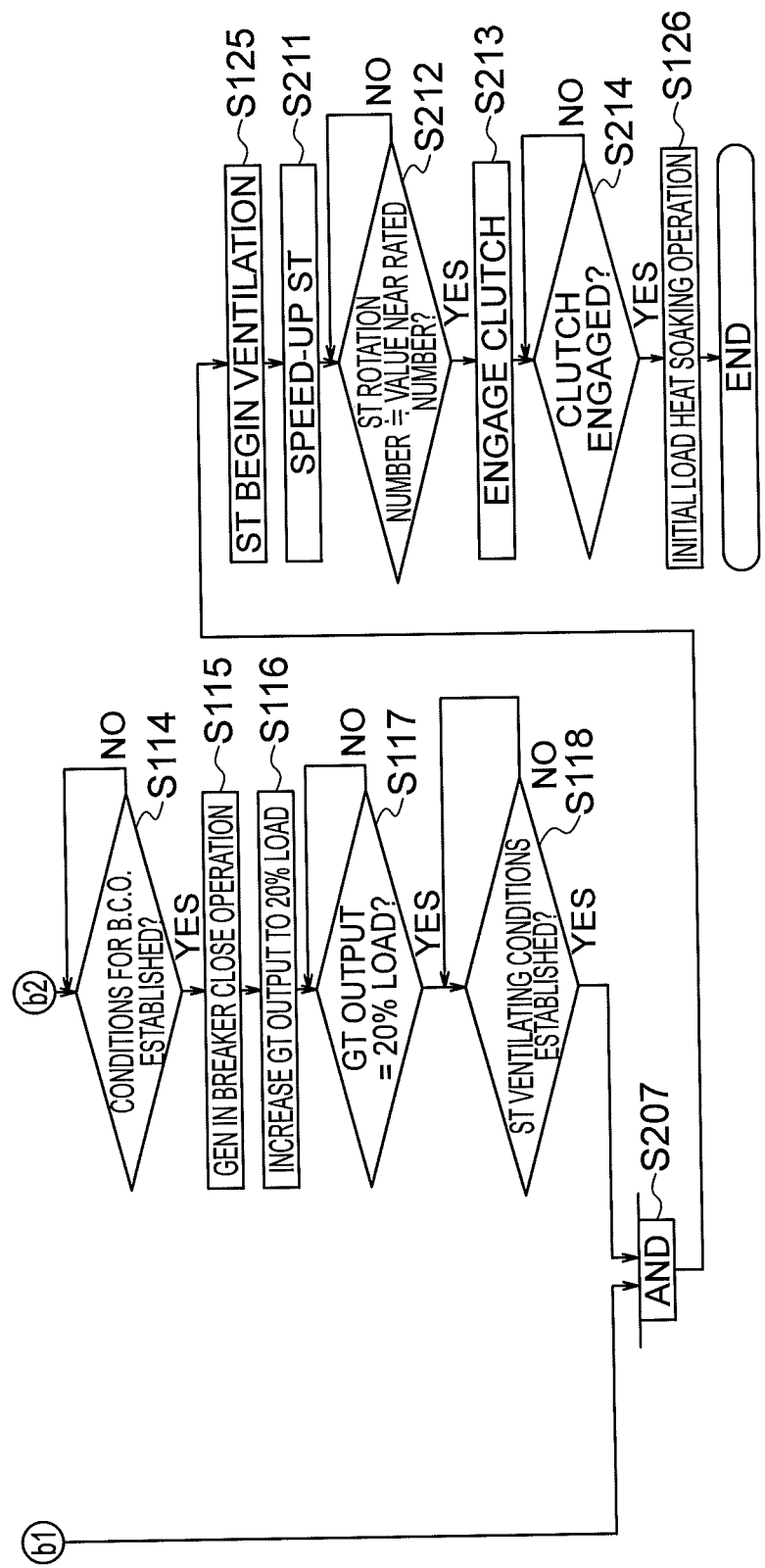

FIGS. 3A and 3B are flowcharts illustrating operation of the power plant 100a of the second embodiment. This flowchart is realized by software stored in the plant control apparatus 101a. Specific numerical values used in the description made hereinafter are merely examples described for facilitating the understanding.

Steps S201, S202, and S106 in FIG. 2A are respectively changed to steps S301, S302, and S303 in FIG. 3A. FIGS. 3A and 3B differ from FIGS. 2A and 2B with respect to these three steps, but other steps in FIGS. 3A and 3B are equal to corresponding steps in FIGS. 2A and 2B. Accordingly, steps S301, S302, S303 are mainly described hereinafter.

After vacuum increase in the condenser 113 is performed (step S102), prewarming begins. In performing prewarming, the warming valve 125 is opened (step S103) so as to feed the auxiliary steam A3, supplied from the auxiliary boiler 124, to the high-pressure turbine 103a and the reheater 112 (step S104). The temperature sensor TS1 measures the metal temperature of the first stage shell inner surface which is a constitutional element of the rotor 103c (step S105).

After 3 hours from when the prewarming begins, the metal temperature of the first stage shell inner surface reaches 150° C. In this embodiment, the auxiliary steam A3 is continuously fed to the high-pressure turbine 103a even after the metal temperature of the first stage shell inner surface reaches 150° C. Accordingly, the metal temperature rises at a rate of temperature rise of approximately 0.2° C./min, and reaches approximately 162° C. after a lapse of 1 hour from reaching 150° C. Further, the temperature of the inside of the rotor 103c which does not come into direct contact with the auxiliary steam A3 also rises due to heat transfer from the surface and hence, the temperature of the rotor 103c including the inside thereof gradually rises to have a uniform temperature.

In this embodiment, the service initiation of the exhaust heat recovering boiler 104 begins without waiting for the end of the prewarming in the same manner as the first embodiment. The starting of the gas turbine 102 in this embodiment is expected to begin after a lapse of 20 minutes from when the metal temperature of the first stage shell inner surface reaches 150° C. or more. By taking into account, in addition to the above, 10 minutes which is the time required for performing the service initiation of the exhaust heat recovering boiler 104, it is sufficient to begin the service initiation of the exhaust heat recovering boiler 104 after a lapse of 10 minutes from when the metal temperature of the first stage shell inner surface reaches 150° C. or more.

The plant control apparatus 101a performs the service initiation of the exhaust heat recovering boiler 104 (step S108) when the metal temperature of the first stage shell inner surface reaches 150° C. or more, and after a lapse of 10 minutes from when the metal temperature of the first stage shell inner surface reaches 150° C. or more (step S301 YES). In this service initiation, a water supply pump attached to the exhaust heat recovering boiler 104 is started, and a water level in the drum 110 is set at a predetermined value. Preparation for the exhaust heat recovering boiler 104 receiving the gas turbine exhaust gas A1 is performed as described above. The service initiation of the exhaust heat recovering boiler 104 is a starting step which requires 10 minutes.

After the lapse of the 10 minutes, the service initiation of the exhaust heat recovering boiler 104 is ended. After the plant control apparatus 101a confirms a lapse of 20 minutes from when the metal temperature of the first stage shell inner surface reaches 150° C. or more (step S302 YES), as a precaution, the plant control apparatus 101a also confirms that the service initiation of the exhaust heat recovering boiler 104 is ended by AND gate process (step S203). Then, the plant control apparatus 101a starts the gas turbine 102 (step S109).

Ventilating permission conditions of the steam turbine 103 are established (step S118 YES) after a lapse of 40 minutes from the starting of the gas turbine 102 in step S109. The main constitutional elements of the ventilating conditions in this embodiment are the pressure condition, the flow rate condition, and the temperature condition of the main steam A2. The ventilating conditions are established when all of these conditions reach predetermined values.

Simultaneously with the establishment of the ventilating conditions, the plant control apparatus 101a confirms a lapse of 60 minutes from when the metal temperature of the first stage shell inner surface reaches 150° C. or more (step S303 YES), and the plant control apparatus 101a closes the warming valve 125 (step S107) to end prewarming. Accordingly, also in this embodiment, the timing at which the prewarming is ended and the timing at which the ventilating conditions of the steam turbine 103 are established are synchronized and hence, the following ventilation of the steam turbine 103 (step S125) is rapidly started at this time point.

After the plant control apparatus 101a determines, by an AND gate process (step S207), both of that ventilating permission conditions of the steam turbine 103 are established (step S118 YES) and that the warming valve 125 is fully closed (step S206 YES), the plant control apparatus 101a begins the ventilation of the steam turbine 103 (step S125). Starting steps which follow thereafter are substantially equal to corresponding steps in the first embodiment and hence, the description of such steps is omitted.

(5) Advantageous Effect of Second Embodiment

Figure 6:
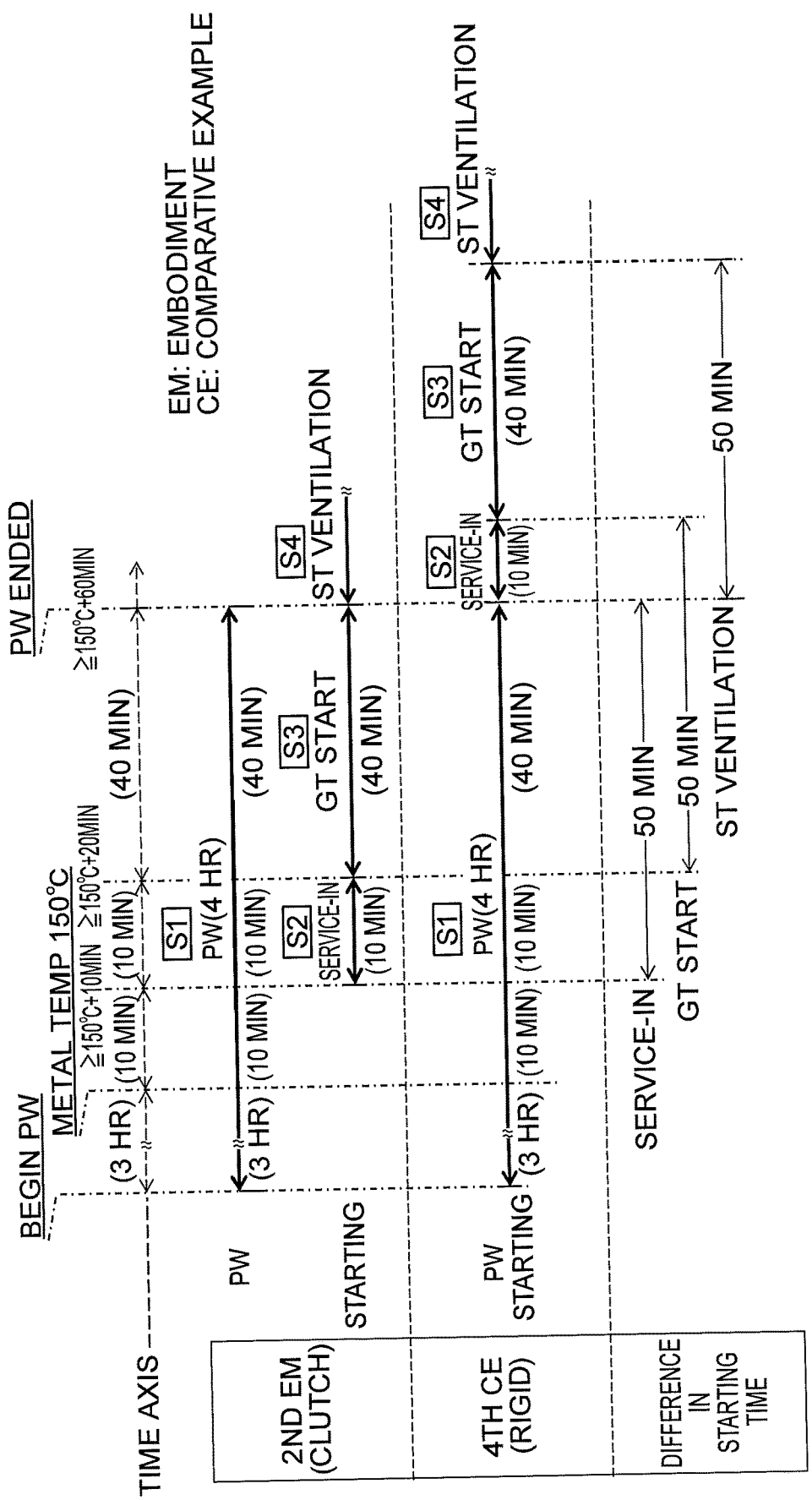
FIG. 6 is a chart for comparing the second embodiment with a fourth comparative example.

FIG. 6 is a chart for comparing the second embodiment with the fourth comparative example, and is also a chart for directly visualizing the advantageous effects of the second embodiment.

The fourth comparative example relates to a starting process of the rigid connection C/C which is equal to that in the first comparative example. A prewarming time in the first comparative example is 3 hours. On the other hand, a prewarming time in the fourth comparative example is 4 hours including 1 hour of the above-mentioned waiting time. In the same manner as FIG. 5, the second embodiment and the fourth comparative example have the same beginning time and the end time of the prewarming. Accordingly, it is possible to perform the comparison between the second embodiment and the fourth comparative example from the viewpoint of the degree of delay of the beginning of the ventilation of the steam turbine 103 from the end of the prewarming.

As illustrated in FIG. 6, in the fourth comparative example, the ventilation of the steam turbine 103 begins after 50 minutes from the end of the prewarming. On the other hand, in the second embodiment, the ventilation of the steam turbine 103 begins simultaneously with the end of the prewarming. That is, the plant is started 50 minutes earlier in the second embodiment than in the fourth comparative example.

Further, to start the plant 50 minutes earlier than the fourth comparative example is substantially equal to an advantageous effect which can be acquired when the prewarming which requires 240 minutes (4 hours) in the fourth comparative example is shortened to 190 minutes. That is, according to this embodiment, the time associated with the prewarming can be actually shortened to 79% (79[%]=190 minutes/240 minutes).

The shortened time is reduced compared with 72% in the first embodiment. However, instead, it is possible to reduce an error which depends on an accuracy of an estimated rate of temperature rise of the metal temperature of the first stage shell inner surface in the first embodiment (0.2° C./min, for example). Accordingly, the timing at which the prewarming is ended and the timing at which ventilating permission conditions of the steam turbine 103 are established can be more easily synchronized.

Requirements for establishing the above relates to the length of the waiting time (1 hour) and the length of the plant starting time. In this embodiment, a time from the starting of the gas turbine to when ventilating permission conditions of the steam turbine 103 are established is 40 minutes, and the time is shorter than the waiting time of 1 hour. Accordingly, the above can be established. Fortunately, the waiting time of actual prewarming is generally selected from between 1 hour and 3 hours and hence, usually, the waiting time is longer with a margin. It is safe to say that practicability in the second embodiment is guaranteed with respect to such a point.

However, there may be also a case where, due to insufficient waiting time, the second embodiment cannot exceptionally cope with BOP equipment or the like that is started at an initial stage time which is earlier than the starting of the above-mentioned EHC control oil pump or the like. The first embodiment may be applied to such BOP equipment to start the BOP equipment when the metal temperature of the first stage shell inner surface reaches 130° C., for example. On the other hand, the second embodiment may be applied to the service initiation of the gas turbine 102 and the exhaust heat recovering boiler 104 which follow thereafter.

Third Embodiment

Hereinafter, a third embodiment is described. A fifth comparative example is also described in the description of this embodiment.

(1) Configuration of Plant of Third Embodiment

Figure 4:
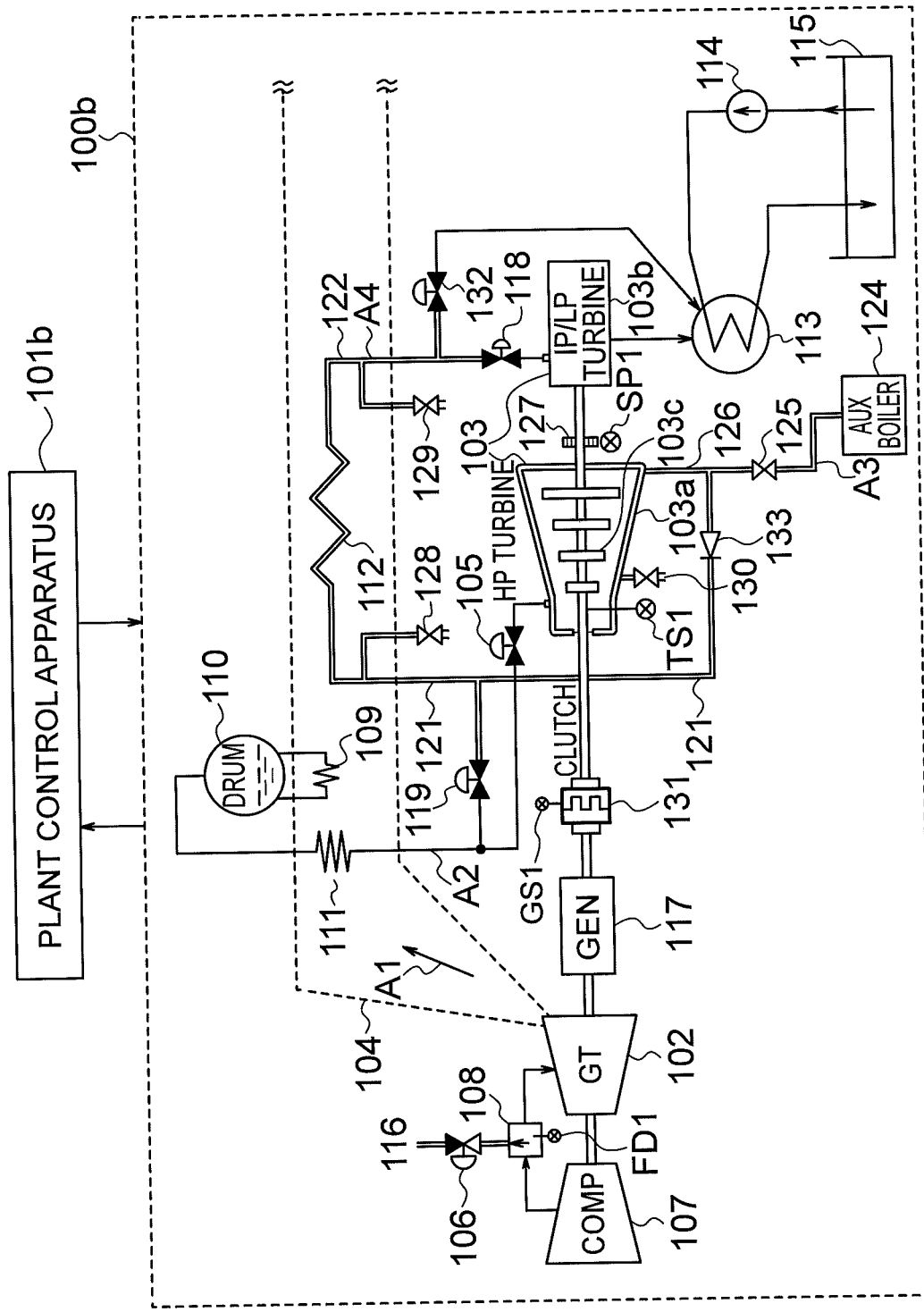
FIG. 4 is a schematic diagram illustrating a configuration of a power plant of a third embodiment.

FIG. 4 is a schematic diagram illustrating a configuration of a power plant 100b of a third embodiment. The power plant 100b illustrated in FIG. 4 is a single shaft C/C power plant.

The power plant 100b illustrated in FIG. 4 includes a plant control apparatus 101b that controls operation of the power plant 100b, and further includes an intermediate-pressure turbine bypass control valve 132 and a check valve 133 in addition to the constitutional elements illustrated in FIG. 1.

The plant control apparatus 101b has a function similar to the above plant control apparatus 101a, but also has a function different from the plant control apparatus 101a. For example, the plant control apparatus 101b can control opening/closing of the intermediate-pressure turbine bypass control valve 132 and the check valve 133. Other functions of the plant control apparatus 101b will be described below.

Superheated steam generated by an exhaust heat recovering boiler 104 is discharged to a steam pipe, as main steam A2. The steam pipe is branched into a main pipe and a bypass pipe. The main pipe is connected to a high-pressure turbine 103a, and the bypass pipe is connected to a low-temperature reheating pipe 121 in this embodiment. An MCV valve 105 is provided in the main pipe. A high-pressure turbine bypass control valve 119 is provided to a connecting portion between the bypass pipe and the low-temperature reheating pipe 121.

When the MCV valve 105 is opened, the main steam A2 from the main pipe is supplied to the high-pressure turbine 103a. On the other hand, when the high-pressure turbine bypass control valve 119 is opened, the main steam A2 from the bypass pipe bypasses the high-pressure turbine 103a, and is sent to the low-temperature reheating pipe 121. The main steam A2 from the bypass pipe is supplied to a reheater 112 through the low-temperature reheating pipe 121.

The check valve 133 is provided in the low-temperature reheating pipe 121 as illustrated in FIG. 4. When the check valve 133 is in an open state, the check valve 133 allows a flow of the main steam A2 (exhaust steam) from the high-pressure turbine 103a to the reheater 112, but blocks a flow of the main steam A2 from the reheater 112 or the high-pressure turbine bypass control valve 119 to the high-pressure turbine 103a. On the other hand, when the check valve 133 is in a closed state, the check valve 133 blocks both flows of the main steam A2.

When the MCV valve 105 is opened as described above, the check valve 133 is also opened. With such a configuration, the main steam A2 (exhaust steam) from the high-pressure turbine 103a is supplied to the reheater 112 through the check valve 133. On the other hand, when the high-pressure turbine bypass control valve 119 is opened as described above, in either case, that is, whether the check valve 133 is opened or closed, the main steam A2 from the bypass pipe is blocked by the check valve 133, and is not supplied to the high-pressure turbine 103a. In this case, the main steam A2 from the bypass pipe is supplied to the reheater 112.

A first end of the reheater 112 is connected to the low-temperature reheating pipe 121, and a second end of the reheater 112 is connected to a high-temperature reheating pipe 122. The reheater 112 in this embodiment takes the main steam A2 from the high-pressure turbine 103a or the high-pressure turbine bypass control valve 119 from the first end, and discharges this main steam A2 from the second end.

For example, the reheater 112 takes the main steam A2 (exhaust steam) from the high-pressure turbine 103a from the first end, and heats the main steam A2 by gas turbine exhaust gas A1 to generate reheat steam A4. That is, the main steam A2 is heated to become the reheat steam A4. The reheater 112 discharges this reheat steam A4 to the high-temperature reheating pipe 122 from the second end.

The high-temperature reheating pipe 122 is branched into a first pipe and a second pipe. The first pipe is connected to an ICV valve 118, and the second pipe is connected to an intermediate-pressure turbine bypass control valve 132. When the ICV valve 118 is opened, the reheat steam A4 from the first pipe is supplied to the intermediate/low-pressure turbine 103b. On the other hand, when the intermediate-pressure turbine bypass control valve 132 is opened, the reheat steam A4 from the second pipe bypasses the intermediate/low-pressure turbine 103b, and is sent to the condenser 113.

As illustrated in FIG. 4, the third embodiment is provided for a combined cycle power plant of a cascade bypass system. In FIG. 4, the high-pressure turbine bypass control valve 119 is connected to the low-temperature reheating pipe 121 which corresponds to an upstream portion of the reheater 112, and the intermediate-pressure turbine bypass control valve 132 is connected to the high-temperature reheating pipe 122 which corresponds to a downstream portion of the reheater 112. In the power plant 100b of this cascade bypass system, it is necessary to provide the check valve 133.

(2) Fifth Comparative Example

Figure 7:
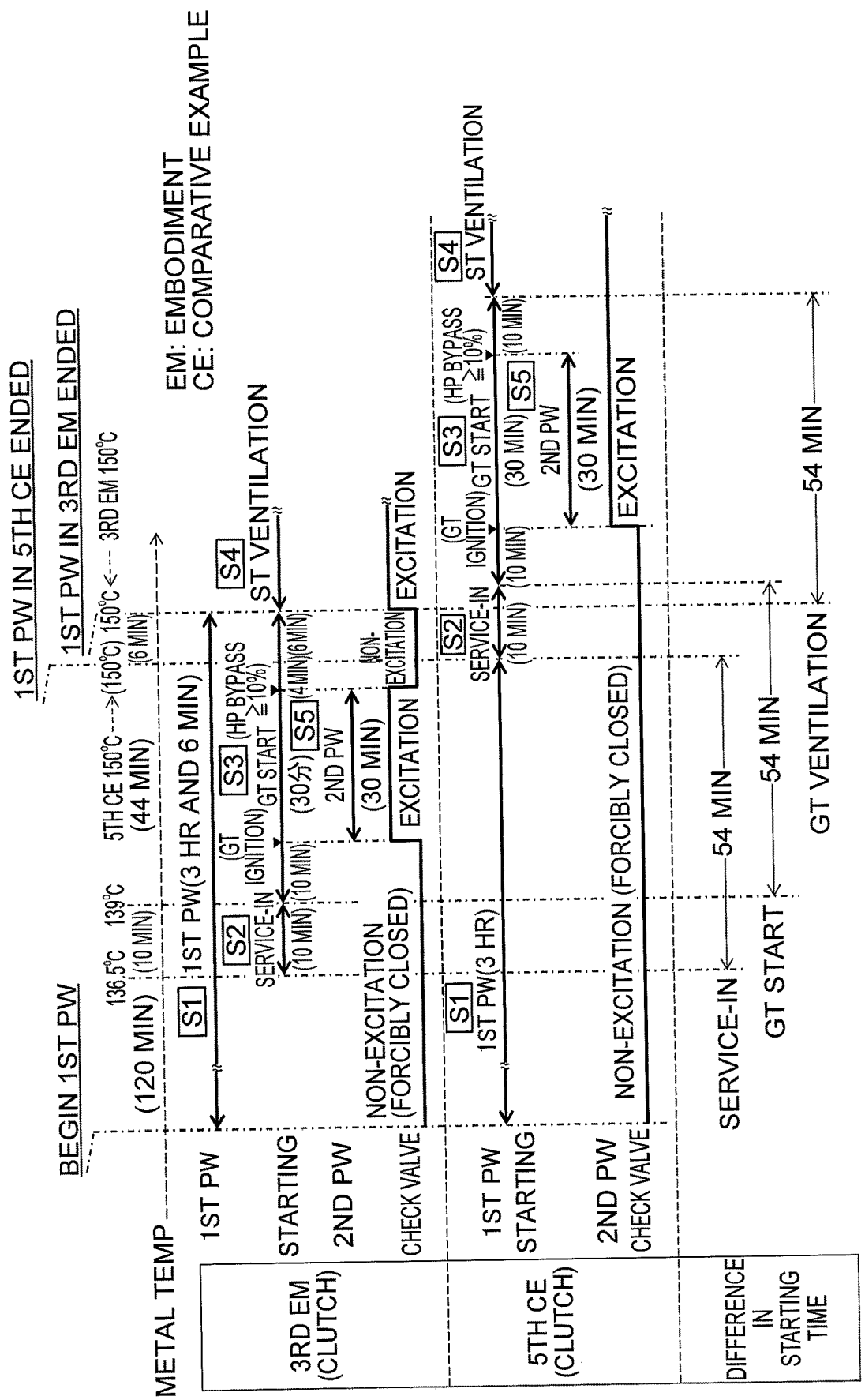
FIG. 7 is a chart for comparing the third embodiment with a fifth comparative example.

FIG. 7 is a chart for comparing the third embodiment with the fifth comparative example, and is also a chart for directly visualizing the advantageous effects of the third embodiment.

The fifth comparative example relates to a starting method of a clutch connection C/C plant of a cascade bypass system. In FIG. 5 and FIG. 6, the clutch connection C/C (first and second embodiments) and the rigid connection C/C (first and fourth comparative examples) are compared with each other. In FIG. 7, however, clutch connection C/Cs are compared with each other. The configuration of the plant of the fifth comparative example is as illustrated in FIG. 4, and is equal to the configuration of the plant of the third embodiment.

Hereinafter, the starting method of the plant of the fifth comparative example illustrated in FIG. 7 is simply described. In addition to the first prewarming and the second prewarming (see reference numerals S1 and S5), FIG. 7 also illustrates a state of the check valve 133 which is closely associated with the first prewarming and the second prewarming. In this comparative example and the third and fourth embodiments, first prewarming is prewarming which is caused to begin first in the plant starting process. On the other hand, second prewarming is prewarming which is caused to begin second in the plant starting process, and the second prewarming begins with a delay from the first prewarming.

In the first prewarming, the auxiliary steam A3 is fed only to the high-pressure turbine 103a by opening the warming valve 125 so as to warm the high-pressure turbine 103a. At this time, the check valve 133 is forcibly closed (non-excitation) and hence, the auxiliary steam A3 is not fed to the reheater 112. The metal temperature of the first stage shell inner surface rises with the starting of the first prewarming and, after 3 hours from when the first prewarming begins, the metal temperature of the first stage shell inner surface reaches 150° C. The warming valve 125 is closed at this point of operation to end the first prewarming.

Thereafter, the service initiation of the exhaust heat recovering boiler 104 requires 10 minutes. After the service initiation of the exhaust heat recovering boiler 104 is ended, the starting of the gas turbine 102 begins. The gas turbine 102 is ignited after 10 minutes from the starting of the gas turbine 102. At a time point when the gas turbine is ignited, the check valve 133 is excited to release forced closing, and the warming valve 125 is opened again. The second prewarming begins in parallel with the step of starting the gas turbine 102 as described above. The second prewarming can be performed as described above due to the configuration of the clutch connection C/C.

In the second prewarming, the auxiliary steam A3 is also fed to the reheater 112 in addition to the high-pressure turbine 103a so that warming of the reheater 112 and purging of a noncondensable gas are started. At this time, the reheater 112 is also warmed from the outer surface by heat of the gas turbine exhaust gas A1 and hence, the reheater 112 can be effectively warmed. After 30 minutes from the ignition of the gas turbine 102, the high-pressure turbine bypass control valve 119 is opened by 10%. At this point, the warming valve 125 is closed to end the second prewarming. That is, the second prewarming is performed for 30 minutes.

After 50 minutes from the starting of the gas turbine 102 begins, ventilating permission conditions of the steam turbine 103 (to be more specific, conditions that all of the pressure, flow rate, and temperature of the main steam A2 reach predetermined values) are established so that ventilation of the steam turbine 103 begins.

(3) Summary of Third Embodiment

The fifth comparative example employs parallel operation of the starting of the gas turbine 102 and the second prewarming by making use of characteristics of the clutch connection C/C. On the other hand, in the third embodiment, to start the plant earlier, the starting of the gas turbine 102, first prewarming and second prewarming are performed in parallel. The first prewarming and the second prewarming in this embodiment are respectively examples of the first warming and second warming.

In this case, however, the second prewarming begins at the time when the gas turbine 102 is ignited (after 10 minutes from the starting of the gas turbine 102), and the second prewarming is ended when the high-pressure turbine bypass control valve 119 is opened by 10% (after 40 minutes from the starting of the gas turbine 102). This means that the second prewarming is restricted by the step of starting the gas turbine 102 and hence, the second prewarming has no degree of freedom in starting and ending the second prewarming at a desired timing. For example, a starting method of the plant is not allowed where second prewarming begins corresponding to the metal temperature of the first stage shell inner surface. Accordingly, in this embodiment, the starting of the gas turbine 102, the first prewarming, and the second prewarming are targets of the parallel operation. However, in the same manner as the first embodiment, the starting of the gas turbine 102 and the first prewarming are substantially targets for the parallel operation.

In this embodiment, optimum plant starting can be realized by causing the timing at which the first prewarming is ended and the timing at which ventilating permission conditions of the steam turbine 103 are established to be synchronized. The first prewarming and the second prewarming progress in parallel for 30 minutes and hence, proper handling is required during the 30 minutes.

For example, in the starting step which progresses in parallel with the first prewarming, the service initiation of the exhaust heat recovering boiler 104 is started, and the gas turbine 102, which requires no low pressure cooling is started. These starting steps per se do not consume the auxiliary steam A3 and hence, these starting steps can be performed in parallel with the first prewarming. However, the second prewarming consumes the auxiliary steam A3 and hence, the second prewarming conflicts with the first prewarming in such a point and hence, the following organization of a starting time is required.

(4) Starting Time in Third Embodiment

Before the description of the third embodiment is made in detail, (i) a time required for establishing ventilating conditions of the steam turbine 103, (ii) the rate of temperature rise of the metal temperature of the first stage shell inner surface, and (iii) a time required for performing first prewarming are organized as follows.

First, with respect to (i), in the same manner as the fifth comparative example, assume an example of starting which requires 50 minutes from the starting of the gas turbine 102 to when ventilating permission conditions of the steam turbine 103 (to be more specific, conditions that all of the pressure, flow rate, and temperature of the main steam A2 reach predetermined values) are established.

Next, with respect to (ii), the rate of temperature rise of the metal temperature of the first stage shell inner surface in first prewarming is assumed as 0.25° C./min for the purpose of convenience of the description. However, the rate of temperature rise during 30 minutes, where first prewarming and second prewarming progress in parallel, is assumed as 0.2° C./min for the following reasons. In the first prewarming, warming is performed by feeding the auxiliary steam A3 only to the high-pressure turbine 103a and hence, there is no possibility that heat quantity of the auxiliary steam A3 is taken away by the reheater 112 so that the metal temperature of the first stage shell inner surface rises faster than the first embodiment. However, during 30 minutes where first prewarming and second prewarming progress in parallel, heat quantity of the auxiliary steam A3 is used for warming both of the high-pressure turbine 103a and the reheater 112 and hence, the rate of temperature rise of the metal temperature of the first stage shell inner surface is reduced compared with that in a period other than the 30 minutes. Accordingly, the rate of temperature rise during the 30 minutes is assumed as 0.2° C./min in the same manner as the first embodiment.

Next, with respect to (iii), in the fifth comparative example, 3 hours is required for performing first prewarming. On the other hand, in the third embodiment, 3 hours and 6 minutes, which is 6 minutes longer than the fifth comparative example, is required for performing the first prewarming. The reason is that, during the 30 minutes where first prewarming and second prewarming progress in parallel and which is described in the above-mentioned (ii), temperature rises of the metal temperature of the first stage shell inner surface is delayed. Further, the delay of the 6 minutes is calculated as follows. The delay in temperature rise of the metal temperature of the first stage shell inner surface which is generated during the 30 minutes is 1.5° C. (1.5° C.=30 minutes×[0.25° C./minutes−0.2° C./min]). After the second prewarming is ended, the rate of temperature rise returns to 0.25° C./min again. To cause the metal temperature of the first stage shell inner surface to rise by 1.5° C., which is the amount of the delay, at the rate of temperature rise of 0.25° C./min, 6 minutes is required (6 minutes=1.5° C./0.25° C./min).

On the premise that the starting time is organized as described above, the first prewarming and the starting of the gas turbine 102 are caused to progress in parallel so as to cause the timing at which the first prewarming is ended and the timing at which ventilating permission conditions of the steam turbine 103 are established to be synchronized. Accordingly, in this embodiment, the gas turbine 102 is started when the metal temperature of the first stage shell inner surface rises to 139° C. during the first prewarming (139° C.=150° C.−[50 minutes−30 minutes]×0.25° C./minutes−30 minutes×0.2° C./min). With such a configuration, a time point when the metal temperature of the first stage shell inner surface rises to 150° C. so that the first prewarming is ended and a time point when the ventilating permission conditions of the steam turbine 103 are established can be synchronized. When the metal temperature of the first stage shell inner surface reaches 136.5° C., the service initiation of the exhaust heat recovering boiler 104 begins in time for the synchronization (136.5° C.=139° C.−10 minutes×0.25° C./min). Hereinafter, the third embodiment illustrated in FIG. 7 is described in detail.

In first prewarming, the auxiliary steam A3 is fed only to the high-pressure turbine 103a by opening the warming valve 125 so as to warm the high-pressure turbine 103a. At this time, the check valve 133 is forcibly closed (non-excitation) and hence, the auxiliary steam A3 is not fed to the reheater 112.

When the first prewarming begins, the metal temperature of the first stage shell inner surface rises (the rate of temperature rise at this time is 0.25° C./min). When the metal temperature reaches 136.5° C., the service initiation of the exhaust heat recovering boiler 104 is started. Thereafter, the service initiation of the exhaust heat recovering boiler 104 is ended after a lapse of 10 minutes. Simultaneously with the end of the service initiation, the metal temperature of the first stage shell inner surface reaches 139° C. The starting of the gas turbine 102 begins after it is confirmed that the metal temperature of the first stage shell inner surface reaches 139° C.

The gas turbine 102 is ignited after 10 minutes from the starting of the gas turbine 102. At a time point when the gas turbine 102 is ignited, the check valve 133 is excited to release forced closing. At this time, the warming valve 125 is already in an open state and hence, the auxiliary steam A3 is also fed to the reheater 112 in addition to the high-pressure turbine 103a, to which the auxiliary steam A3 is already fed, so that second prewarming begins. With such operations, the first prewarming and the second prewarming progress in parallel (the rate of temperature rise at this time is reduced to 0.2° C./min). Warming of the reheater 112 and purging of a noncondensable gas are caused to begin by the second prewarming.

After 40 minutes from the starting of the gas turbine 102 (after 30 minutes from the ignition of the gas turbine 102), the high-pressure turbine bypass control valve 119 is opened by 10%, and the second prewarming is ended at this point of operation. At this time, in this embodiment, feeding of the auxiliary steam A3 to the reheater 112 is blocked by forcibly closing (non-excitation) the check valve 133 so as to end the second prewarming. As described above, in the fifth comparative example, the second prewarming is ended by closing the warming valve 125. On the other hand, in this embodiment, even after the second prewarming is ended, it is necessary to hold the warming valve 125 in an open state so as to continue warming of the high-pressure turbine 103a. Accordingly, the check valve 133 is forcibly closed instead.

Even after the second prewarming is ended, the metal temperature of the first stage shell inner surface continues to rise (the rate of temperature rise returns to 0.25° C./min at this time). After 50 minutes from the starting of the gas turbine 102, the metal temperature of the first stage shell inner surface reaches 150° C., and the first prewarming is ended by closing the warming valve 125. Simultaneously with the end of the first prewarming, ventilating permission conditions of the steam turbine (to be more specific, conditions that all of the pressure, flow rate, and temperature of the main steam A2 reach predetermined values) are established so that ventilation of the steam turbine 103 begins. To feed exhaust steam discharged from the high-pressure turbine 103a to the reheater 112 after the ventilation is performed, the check valve 133 is excited again immediately before the ventilation begins.

(5) Advantageous Effect of Third Embodiment

In FIG. 7, the third embodiment and the fifth comparative example start first prewarming at the same time (however, the first prewarming ends at different times). Accordingly, in comparing the third embodiment and the fifth comparative example with each other, comparison is performed while a beginning time of the first prewarming is used as the reference.

In the fifth comparative example, the ventilation of the steam turbine 103 begins after 240 minutes (4 hours) from when first prewarming begins. On the other hand, in the third embodiment, the ventilation of the steam turbine 103 begins after 186 minutes (3 hours and 6 minutes) from when the first prewarming begins. That is, the plant is started 54 minutes earlier in the third embodiment than in the fifth comparative example.

Further, to start the plant 54 minutes earlier than the fifth comparative example is substantially equal to an advantageous effect which can be acquired when the first prewarming which requires 180 minutes (3 hours) in the fifth comparative example is shortened to 126 minutes. That is, according to this embodiment, the time associated with the first prewarming can be actually shortened to 70% (70[%] =126 minutes/180 minutes).

(6) Third Embodiment and Parallel Warming

In the third embodiment, parallel operation of the first prewarming and the second prewarming is performed. At this time, parallel warming is performed where both the high-pressure turbine 103a and the reheater 112 are warmed in parallel. This parallel warming is further described.

In the conventional plant starting of the rigid connection C/C which uses a cascade bypass, a check valve is brought into a non-excitation state to forcibly close the check valve before prewarming is performed so that flowing-in of auxiliary steam to a reheater is blocked. Parallel warming is avoided in this manner. The purpose of avoiding the parallel warming is to efficiently end prewarming of a high-pressure turbine in a short time. However, the third embodiment is a starting method which employs parallel warming, which has been avoided, to attempt to start the plant earlier.

As already described, the advantageous effect of the third embodiment is to be able to start the plant 54 minutes earlier than the fifth comparative example. The gain of the 54 minutes is a gain which is reduced from the gain of 60 minutes since additional 6 minutes is required for performing first prewarming due to parallel warming. Accordingly, if this parallel warming is not performed, it is possible to expect to have the advantageous effect of starting the plant 60 minutes earlier. However, it is safe to say that the third embodiment is preferable from a viewpoint that the gain is reduced only for a short time of 6 minutes. With respect to the above, this embodiment has the following characteristics of eliminating or mitigating a demerit of parallel warming.

First, of 3 hours and 6 minutes which is required for the first prewarming, parallel warming (second prewarming) is performed only for a short time of 30 minutes, and the reheater 112 can be sufficiently warmed with this short time. The reason why the reheater 112 can be sufficiently warmed with this short time is that the reheater 112 is efficiently warmed by also making use of heat source formed of the gas turbine exhaust gas A1. Further, the reason why this warming which uses exhaust gas heat source can be performed is that also the third embodiment employs a clutch connection.

Second, parallel warming (second prewarming) begins after first prewarming progresses for 140 minutes, and the metal temperature of the first stage shell inner surface at that time is already warmed to approximately 140° C. Accordingly, at this time point, there is no possibility that a large amount of drain water is generated in the high-pressure turbine 103a. When the second prewarming is performed, the rate of temperature rise of the metal temperature of the first stage shell inner surface is reduced from 0.25° C./min to 0.2° C./min. However, the reduced amount is 0.05° C./min, that is, extremely small. This extremely small amount of reduction continues only for a short time of 30 minutes and hence, the end of the first prewarming in the third embodiment is delayed only by 6 minutes.

On the other hand, assume a case where parallel warming is started earlier so that parallel warming is performed in a state where the metal temperature of the first stage shell inner surface is still low and a heat source formed of the gas turbine exhaust gas A1 is not present. In this case, the auxiliary steam A3 which is fed comes into contact with metal of a low temperature so that the auxiliary steam A3 condenses to generate a large amount of drain water. As a result, a temperature rise of the metal temperature of the first stage shell inner surface is significantly delayed so that the end of the first prewarming is delayed by 1 hour or 2 hours, for example.

As described above, according to this embodiment, the first prewarming and the second prewarming can be suitably performed in parallel.

Fourth Embodiment

Hereinafter, a fourth embodiment is described. A fourth comparative example is also described in the description of this embodiment.

The first prewarming in the third embodiment is ended when the metal temperature of the first stage shell inner surface reaches 150° C. or more. On the other hand, first prewarming in the fourth embodiment is, in the same manner as the prewarming in the second embodiment, ended when the metal temperature of the first stage shell inner surface reaches 150° C. or more, and a state in which the metal temperature is 150° C. or more continues for a predetermined time. The starting method of the fourth embodiment can be performed in the power plant 100b illustrated in FIG. 4.

In the second embodiment, a case is assumed where the prewarming is ended when the metal temperature of the first stage shell inner surface reaches 150° C. or more, and a state in which the metal temperature is 150° C. or more continues for 1 hour (60 minutes). On the other hand, in the fourth embodiment, a case is assumed where first prewarming is ended when the metal temperature of the first stage shell inner surface reaches 150° C. or more, and a state in which the metal temperature is 150° C. or more continues for 90 minutes.

Points which are changed from the third embodiment in the fourth embodiment are as follows.

The gas turbine 102 in the third embodiment is started when the metal temperature of the first stage shell inner surface reaches 139° C. or more. On the other hand, the gas turbine 102 in the fourth embodiment is started when the metal temperature of the first stage shell inner surface reaches 150° C. or more, and a state in which the metal temperature is 150° C. or more continues for a predetermined time (40 minutes, for example).

The first prewarming in the fourth embodiment is ended after 50 minutes from the starting of the gas turbine 102 (90 minutes−40 minutes). Accordingly, starting the gas turbine 102 at this timing allows the timing at which the first prewarming is ended and the timing at which ventilating permission conditions of the steam turbine 103 are established to be synchronized.

Further, in the third embodiment, the service initiation of the exhaust heat recovering boiler 104 begins when the metal temperature of the first stage shell inner surface reaches 136.5° C. or more. On the other hand, in the fourth embodiment, the service initiation of the exhaust heat recovering boiler 104 begins when the metal temperature of the first stage shell inner surface reaches 150° C. or more, and a state in which the metal temperature is 150° C. or more continues for a predetermined time (30 minutes, for example).

With such a configuration, the fourth embodiment can realize the plant starting process where the timing at which the first prewarming is ended and the timing at which ventilating permission conditions of the steam turbine 103 are established are synchronized.

As described above, in the first to fourth embodiments, when the clutch 131 is in a released state, the gas turbine 102 and the generator 117 are allowed to be precedingly started. At this time, the steam turbine 103 is in a stop state or in an extremely low rotation number state and hence, the prewarming or the first prewarming can be performed during the starting of the gas turbine 102. In the first to fourth embodiments, the starting of the gas turbine 102 begins corresponding to the metal temperature of the first stage shell inner surface before the prewarming or the first prewarming is ended. Accordingly, it is possible to start the plant earlier such that ventilation of the steam turbine 103 can be performed simultaneously with the end of the prewarming or the first prewarming. According to the first to fourth embodiments, for example, it is possible to start the plant earlier as in the case where prewarming time is shortened while an existing prewarming method is employed.

While certain embodiments have been described, these embodiments have been presented by way of example only, and are not intended to limit the scope of the inventions. Indeed, the novel apparatuses, methods and plants described herein may be embodied in a variety of other forms; furthermore, various omissions, substitutions and changes in the form of the apparatuses, methods and plants described herein may be made without departing from the spirit of the inventions. The accompanying claims and their equivalents are intended to cover such forms or modifications as would fall within the scope and spirit of the inventions.

The invention claimed is:

1. A plant control apparatus configured to control a power plant, the plant comprising:
   a gas turbine;
   a generator configured to be driven by the gas turbine;
   an exhaust heat recovering boiler configured to generate first steam by using heat of exhaust gas from the gas turbine;
   a steam turbine configured to be driven by the first steam;
   a clutch configured to connect a first shaft that is connected to the gas turbine and to the generator with a second shaft that is connected to the steam turbine; and
   a clutch engagement detector configured to detect whether or not the clutch is engaged,
   the apparatus comprising:
   a receiver configured to receive a detection result whether or not the clutch is engaged from the clutch engagement detector;
   a starting module configured to start the gas turbine and the generator while holding the steam turbine in a stop state, when the detection result received by the receiver indicates that the clutch is in a released state; and
   a warming module configured to warm the steam turbine by supplying second steam from equipment that is different from the exhaust heat recovering boiler to the steam turbine in parallel with the starting of the gas turbine and the generator, when the detection result received by the receiver indicates that the clutch is in a released state.

2. The apparatus of claim 1, wherein
   the power plant further comprises a metal temperature sensor configured to detect a metal temperature of the steam turbine,
   the warming module ends the warming of the steam turbine based on the metal temperature detected by the metal temperature sensor, and
   the starting module begins the starting of the gas turbine based on the metal temperature detected by the metal temperature sensor.

3. The apparatus of claim 2, wherein
   the warming module ends the warming of the steam turbine when the metal temperature reaches a predetermined temperature or after a lapse of a predetermined time from the metal temperature reaching the predetermined temperature, and
   the starting module begins the starting of the gas turbine when the metal temperature reaches a predetermined temperature or after a lapse of the predetermined time from the metal temperature reaching the predetermined temperature.

4. The apparatus of claim 2, wherein the metal temperature is a temperature of a first stage shell inner surface metal of the steam turbine.

5. The apparatus of claim 1, wherein
   the exhaust heat recovering boiler comprises an evaporator configured to generate steam from water supplied from a drum, and a pump configured to supply the water to the drum, and
   the starting module starts the pump to cause a water level in the drum to reach a predetermined value during a period where the steam turbine is warmed by the second steam.

6. The apparatus of claim 1, wherein the starting module starts the gas turbine such that a time point when the warming of the steam turbine is ended and a time point when the first steam reaches a state in which ventilation of the steam turbine is allowed are synchronized.

7. The apparatus of claim 6, wherein the time point when the first steam reaches the state in which the ventilation of the steam turbine is allowed is a time point when all or a part of a temperature, a pressure and a flow rate of the first steam reach a state in which the first steam can drive the steam turbine.

8. The apparatus of claim 1, wherein the warming module warms the steam turbine by the second steam in a state in which the gas turbine and the generator are started and the steam turbine in a stop state performs idling rotation.

9. The apparatus of claim 1, wherein the warming module interrupts the warming of the steam turbine by the second steam in a state where a rotation number of the steam turbine is a predetermined rotation number or more.

10. The apparatus of claim 9, wherein the predetermined rotation number is a rotation number that is set based on frictional heat generated in the steam turbine when the second steam flows into the steam turbine.

11. The apparatus of claim 1, wherein the plant further comprises:
    a reheater provided in the exhaust heat recovering boiler, and configured to heat exhaust steam from the steam turbine by the exhaust gas to generate reheat steam; and
    a reheat turbine configured to be driven by the reheat steam,
    wherein the warming module executes first warming where the steam turbine is warmed by the second steam and second warming where the reheater is warmed by the second steam, begins the starting of the gas turbine during execution of the first warming, and begins the second warming with the gas turbine being ignited.

12. The apparatus of claim 11, wherein
the power plant further comprises a metal temperature sensor configured to detect a metal temperature of the steam turbine,
the warming module ends the first warming based on the metal temperature detected by the metal temperature sensor, and
the starting module begins the starting of the gas turbine based on the metal temperature detected by the metal temperature sensor.

13. A plant control method for controlling a power plant, the power plant comprising:
a gas turbine;
a generator configured to be driven by the gas turbine;
an exhaust heat recovering boiler configured to generate first steam by using heat of exhaust gas from the gas turbine;
a steam turbine configured to be driven by the first steam;
a clutch configured to connect a first shaft that is connected to the gas turbine and to the generator with a second shaft that is connected to the steam turbine; and
a clutch engagement detector configured to detect whether or not the clutch is engaged,
the method comprising:
receiving a detection result whether or not the clutch is engaged from the clutch engagement detector;
starting the gas turbine and the generator while holding the steam turbine in a stop state, when the received detection result indicates that the clutch is in a released state; and
warming the steam turbine by supplying second steam from equipment that is different from the exhaust heat recovering boiler to the steam turbine in parallel with the starting of the gas turbine and the generator, when the received detection result indicates that the clutch is in a released state.

14. A power plant comprising:
a gas turbine;
a generator configured to be driven by the gas turbine;
an exhaust heat recovering boiler configured to generate first steam by using heat of exhaust gas from the gas turbine;
a steam turbine configured to be driven by the first steam;
a clutch configured to connect a first shaft that is connected to the gas turbine and to the generator with a second shaft that is connected to the steam turbine;
a clutch engagement detector configured to detect whether or not the clutch is engaged;
a receiver configured to receive a detection result whether or not the clutch is engaged from the clutch engagement detector;
a starting module configured to start the gas turbine and the generator while holding the steam turbine in a stop state, when the detection result received by the receiver indicates that the clutch is in a released state; and
a warming module configured to warm the steam turbine by supplying second steam from equipment that is different from the exhaust heat recovering boiler to the steam turbine in parallel with the starting of the gas turbine and the generator, when the detection result received by the receiver indicates that the clutch is in a released state.

\* \* \* \* \*